US006957291B2

(12) United States Patent
Moon et al.

(10) Patent No.: US 6,957,291 B2
(45) Date of Patent: Oct. 18, 2005

(54) REMOVABLE DISK STORAGE ARRAY EMULATING TAPE LIBRARY HAVING BACKUP AND ARCHIVE CAPABILITY

(75) Inventors: William G. Moon, Provo, UT (US); Chris Dudte, Sun Valley, NV (US); Michael Cornwell, Santa Cruz, CA (US); Ronald K. Scott, Claremore, OK (US); Kevin Daly, Newport Beach, CA (US)

(73) Assignee: Quantum Corporation, San Jose, CA (US)

( * ) Notice: Subject to any disclaimer, the term of this patent is extended or adjusted under 35 U.S.C. 154(b) by 420 days.

(21) Appl. No.: 09/822,192

(22) Filed: Mar. 29, 2001

(65) Prior Publication Data

US 2002/0144044 A1 Oct. 3, 2002

(51) Int. Cl.[7] .......................... G06F 13/00; G11B 21/08
(52) U.S. Cl. .......................... 710/302; 710/104; 714/6; 369/30.01; 361/685
(58) Field of Search .................. 361/726, 683, 361/685, 686; 714/5, 7, 6, 770, 27; 711/114, 111, 112, 118; 719/325; 369/30.28, 30.34, 30.38, 30.58, 30.31; 700/214, 215; 360/98.01, 77.08, 49; 710/302, 2, 104; 703/24–25; 707/1; 713/330; 324/529

(56) References Cited

U.S. PATENT DOCUMENTS

| | | | | |
|---|---|---|---|---|
| 4,467,421 A | | 8/1984 | White ........................ 364/200 |
| 4,675,856 A | | 6/1987 | Rudy et al. .................... 369/36 |
| 5,097,439 A | | 3/1992 | Patriquin et al. ........... 395/425 |
| 5,253,129 A | | 10/1993 | Blackborow et al. ......... 360/69 |
| 5,297,067 A | | 3/1994 | Blackborow et al. .... 364/708.1 |
| 5,297,124 A | * | 3/1994 | Plotkin et al. ................ 360/49 |
| 5,367,669 A | * | 11/1994 | Holland et al. ................ 714/7 |
| 5,410,439 A | | 4/1995 | Egbert et al. .................. 360/75 |
| 5,423,046 A | * | 6/1995 | Nunnelley et al. .......... 713/330 |
| 5,638,347 A | * | 6/1997 | Baca et al. ............... 369/30.31 |
| 5,684,671 A | * | 11/1997 | Hobbs et al. ................ 361/683 |
| 5,726,922 A | * | 3/1998 | Womble et al. ............. 361/726 |
| 5,760,995 A | | 6/1998 | Heller et al. .................. 360/92 |
| 5,870,732 A | * | 2/1999 | Fisher et al. ................... 707/1 |
| 5,894,376 A | * | 4/1999 | Rinard .................... 360/77.08 |
| 5,925,119 A | | 7/1999 | Maroney .................... 710/126 |

(Continued)

OTHER PUBLICATIONS

Statutory Invention Registration H1221, Aug. 3, 1993 to Best et al. for High Speed, Small Diameter Disk Storage System.

S. Rogers, Ed.in Chief, *Building Storage Networks*, Osborne/McGraw Hill, Berkeley, CA ©2000 pp. 374–376.

*Primary Examiner*—Glenn A. Auve
*Assistant Examiner*—Christopher E. Lee
(74) *Attorney, Agent, or Firm*—Morrison & Foerster LLP

(57) ABSTRACT

A hard disk drive based data archive system emulating a tape archive system includes a hot pluggable multi-drive magazine having a housing for holding a plurality of hard disk drives, each drive connected to receive power and data from the magazine in a controlled fashion, and at least one magazine receiving system for physically receiving the magazine and for thereupon providing power, data and control connections to the magazine, such that when the magazine is received within the magazine receiving system, the hard disk drives selectively receive power and data connections via the magazine and receiving system from a host computer. The magazine may be hot-disconnected from an active computing system environment and removed to an archive rack wherein each disk drive is periodically checked to ensure functionality and to provide some limited-bandwidth data retrieval functions via a network connection to the archive rack. A file mark structure enables a disk drive in the magazine to emulate functionality of a tape cartridge.

13 Claims, 17 Drawing Sheets

U.S. PATENT DOCUMENTS

| | | | | |
|---|---|---|---|---|
| 5,963,971 | A | | 10/1999 | Fosler et al. ................. 711/114 |
| 6,049,848 | A | | 4/2000 | Yates et al. ..................... 711/4 |
| 6,067,481 | A | | 5/2000 | Saliba et al. ................. 700/214 |
| 6,070,224 | A | | 5/2000 | LeCrone et al. ............ 711/112 |
| 6,076,142 | A | * | 6/2000 | Corrington et al. ......... 711/114 |
| 6,098,148 | A | | 8/2000 | Carlson ....................... 711/112 |
| 6,105,037 | A | | 8/2000 | Kishi .......................... 707/201 |
| 6,122,131 | A | | 9/2000 | Jeppson ................... 360/77.02 |
| 6,128,698 | A | * | 10/2000 | Georgis ....................... 711/111 |
| 6,247,079 | B1 | * | 6/2001 | Papa et al. .................. 710/302 |
| 6,281,685 | B1 | * | 8/2001 | Tuttle .......................... 324/529 |
| 6,324,497 | B1 | * | 11/2001 | Yates et al. ................... 703/24 |
| 6,341,329 | B1 | * | 1/2002 | LeCrone et al. ............ 711/112 |
| 6,341,333 | B1 | * | 1/2002 | Schreiber et al. ........... 711/114 |
| 6,351,825 | B1 | * | 2/2002 | Kaneda et al. ................. 714/27 |
| 6,434,652 | B1 | * | 8/2002 | Bailis et al. ................. 710/302 |
| 6,442,021 | B1 | * | 8/2002 | Bolognia et al. ........... 361/685 |
| 6,460,099 | B1 | * | 10/2002 | Stryker et al. ................. 710/74 |
| 6,467,025 | B1 | * | 10/2002 | Taylor ........................ 711/118 |
| 6,496,791 | B1 | * | 12/2002 | Yates et al. .................... 703/25 |
| 6,510,050 | B1 | * | 1/2003 | Lee et al. .................... 361/685 |
| 6,535,381 | B2 | * | 3/2003 | Jahne et al. ................. 361/685 |
| 6,580,604 | B1 | * | 6/2003 | McAnally et al. .......... 361/685 |
| 6,742,068 | B2 | * | 5/2004 | Gallagher et al. ........... 710/302 |
| 6,757,748 | B1 | * | 6/2004 | Hipp ............................. 710/2 |
| 6,854,070 | B2 | * | 2/2005 | Johnson et al. ................. 714/5 |
| 2002/0080575 | A1 | * | 6/2002 | Nam et al. ................... 361/686 |

* cited by examiner

FileMark Block Structure

| Byte | Description |
|---|---|
| 0-7 | Ascii "FILEMARK" |
| 8 | Major Version |
| 9 | Minor Version |
| 10 | Partition Number |
| 11 | Validily Byte<br>0 bit Mark Type<br>1 bit Previous filemark status<br>2 bit Next filemark status<br>3 bit Previous filemark is Master Record |
| 12-15 | Previous FileMark LBA |
| 16-19 | Next FileMark LBA |
| 20-23 | Block Size |
| 24-509 | Reserved |
| 510 | Two-Complement Checksum bytes (0-509) |

REMOVABLE DISK STORAGE ARRAY EMULATING TAPE LIBRARY HAVING BACKUP AND ARCHIVE CAPABILITY

FIELD OF THE INVENTION

The present invention relates to methods and apparatus for protecting user data within a computer system. More specifically, the present invention relates to a removable rotating disk drive data storage array for emulating tape library functions including backing up and archiving user data.

BACKGROUND OF THE INVENTION

The need for effective and reliable backup and archive of user data information is well known. Considerable information system (IS) resources are devoted to providing backup and archive of information resident in computers and servers within any organization that produces and/or relies upon digital information.

The term "backup" means that periodically, such as each day, a backup record is made which mirrors then-present information content of computer active memory embodied as semiconductor random access memory, and/or a hard disk drive or drives, of a computer or computer server. This backup operation usually, although not necessarily, involves a transfer to magnetic tape and occurs during a period of likely minimum usage of the underlying data storage resource, such as in the middle of the night. If the storage resource is thereafter lost or becomes unavailable on account of equipment failure, or for any other reason, it is then possible to use the backup record to reconstruct the state of the information in storage as of the last backup time and date.

The daily backup procedure may be followed by a weekly backup procedure, a monthly backup procedure, a quarterly backup procedure, and so forth. At any point in the backup procedure, selected backup data storage media, frequently backup tape cartridges, may be physically removed from the system and relocated to a secure storage location away from the information processing/storage center. Secured backup tape cartridges then function as archival tape cartridges. One drawback of archival tape cartridges is that once they are removed to the secure storage site, they become presently unavailable to the computing system; and, depending upon conditions such as temperature, humidity, handling and storage conditions within the storage site, the tape/cartridge may deteriorate or degrade. If later needed, the archived user digital data information on the tape media of such cartridges may turn out to be unavailable.

One procedure which is used to safeguard data integrity of data on archive tape cartridges is to remove each cartridge periodically from the secure storage site, load each cartridge into a tape drive and unspool and respool the reeled tape, by carrying out an operation known as "repacking the tape pancake". During this tape-spooling operation, some or all of the archive data may be read out to determine whether such data remains intact and available as an archive. If the tape media is determined to be deteriorating, as measured by error correction activity for example, a replacement archive tape cartridge may be loaded and the archived data on the failing tape cartridge may then be transferred to the replacement cartridge. Then, the failing tape cartridge can then be discarded. Such procedures tend to be time consuming, labor-intensive, and evidently expensive. Repeated handling and use of a tape cartridge shortens its useful life and can directly lead to its failure as a data archive resource.

One further drawback of tape archiving methods and technology is that drive transports are being constantly improved and upgraded technologically. It has proven very difficult to provide backwards-compatibility in tape archive systems such that more recent tape drives are able to read and recover user data from older tapes using less dense data recording formats, all other considerations being the same.

One other drawback of tape archiving methods has arisen during efforts to re-use archive tapes because of less than complete erasure of overwritten data. This problem has led some users to treat tape cartridges as one-use devices, greatly adding to the expense of tape archive systems operations and management. Also, because the tape cartridge is not a sealed system, external contaminants and influences may prevent a tape transport mechanism from successfully reading an archive tape. Further, tape cartridge handling equipment including tape transports, tend to be very complicated electro-mechanical structures, with multiple tape path control loops and other interactive tape handling processes. If any one of these processes fails or degrades, the tape may be damaged or destroyed. Moreover, tapes written on one tape transport may not be readable on another tape transport because of accumulation of head-tape alignment errors.

Tape recording has evolved since its earliest beginnings over forty years ago. Large reels of open tape have given way to small compact tape cartridges that hold increasing quantities of magnetic storage tape capable of being recorded with ever-greater information density. One form of compact single reel cartridge tape is the streaming digital linear tape system marketed by the assignee of the present invention under the DLT™ brand. The DLT system includes individual tape drives, as well as tape cartridge handling equipment and libraries. Recently, it has been proposed to create a virtual tape library by using a single DLT tape device, or several such devices within a cartridge loader environment. An example of this virtual tape library is found in commonly assigned U.S. Pat. No. 6,067,481 to Saliba, entitled: "Virtual Magnetic Tape Drive Library System". An example of a cartridge loader environment is found in commonly assigned U.S. Pat. No. 5,760,995 to Heller et al., entitled: "Multi-Drive, Multi-Magazine Mass Storage and Retrieval Unit for Tape Cartridges. The disclosures of U.S. Pat. Nos. 6,067,481 and 5,760,995 are incorporated herein by reference thereto.

Cartridge media libraries, whether tape or optical, are well known in the art, and frequently comprise "walls of cartridges" or large cylindrical cartridge bin arrangements. A so-called "picker-gripper" mechanism (robot) operating under computer control accesses a particular cartridge bin, grips the cartridge media unit present, withdraws it from the bin, translates it to a media drive unit and causes the cartridge media unit to be loaded into the drive unit in a predetermined way. One example of an optical storage and retrieval device comprising a wall of optical media cartridges is disclosed in U.S. Pat. No. 4,675,856 to Rudy et al, entitled: "Optical Storage and Retrieval Device", the disclosure thereof being incorporated herein by reference.

Over the past forty years tape storage has been perceived to be a less expensive method for providing off-line storage than disk drives. While tape media alone may be somewhat less expensive than equivalent rotating hard disk drive storage, when a complex electromechanical tape drive is included, the comparison becomes more equivalent. As the rotating hard disk drive storage cost-per-information-unit continues to drop, the storage industry is beginning to shift its paradigm for backup, to other storage systems, such as rotating hard disk drives.

Currently, optical and low-density magnetic media (e.g.: Iomega ZIP™ drive system) are seen as alternatives to tape backup and archive. The Linear Tape Open (LTO) Consortium is offering an alternative to streaming digital linear tape (DLT).

Moreover, it has been proposed to emulate tape systems and libraries with hard disk drive arrays by using a variety of technologies known as "virtual tape". Virtual tape makes disk drive resources appear as if they are sequentially accessed tape drives. By using disk drive subsystems as virtual tape devices, it is possible to stream backup data at very high data rates over a storage application network (SAN). Thus, for applications and computing environments requiring higher-speed backup devices and processes, for example on the order of 40 Mbytes per second or faster, virtual tape may provide the necessary data throughput.

Computer storage systems providers such as IBM, Sun Microsystems, Storage Technology Corporation, and $EMC^2$ Corporation, offer large hard disk drive array products which may be configured as virtual tape libraries, but which do not exactly mirror or correspond to DLT tape backup/archive systems. Examples of prior art virtual tape devices and systems are found in U.S. Pat. No. 4,467,421 to White, entitled: "Virtual Storage System and Method"; U.S. Pat. No. 5,963,971 to Fosler et al., entitled: "Method and Apparatus for Handling Audit Requests of Logical Volumes in a Virtual Media Server"; U.S. Pat. No. 6,049,848 to Yates et al., entitled: "System and Method for Performing High-Speed Tape Positioning Operations"; U.S. Pat. No. 6,070,224 to LeCrone et al., entitled: "Virtual Tape System"; U.S. Pat. No. 6,098,148 to Carlson, entitled: "Storage and Access of Data Using Volume Trailer"; and, U.S. Pat. No. 6,105,037 to Kishi, entitled: "Apparatus for Performing Automated Reconcile Control in a Virtual Tape System". The disclosures of these patents are incorporated herein by reference. These prior disclosures fail to provide any teaching or suggestion that the disk drives or disk drive arrays performing the virtual tape drive emulation can be physically removed from an active data store and relocated to a secure data archive location and then provide the archive function typically performed by removable archive tape media.

Rotating hard disk drives are known to be susceptible to, and can be damaged by, sharp shock forces incident to handling. Such forces may cause the hard ceramic head sliders to deform the relatively soft aluminum alloy disk substrate. Accordingly, while tape storage has been emulated by disk storage, rotating hard disk drives are generally more fragile than tape cartridges from a media handling perspective.

Removable hard disk drive systems are known in the prior art. One example of such a system previously offered for sale by the assignee of the present invention under the "Passport™ brand is described inter alia in U.S. Pat. No. 5,253,129 to Blackborow et al., entitled: "Removable and Transportable Hard Disk Subsystem". That system and patent describes a hard disk drive module which was loaded into, and thereupon electrically connected with, a base housing unit, which was in turn connected electrically to a host computer via a bus structure. A hard disk drive was shock-mounted inside of a metal cartridge to provide primary resistance to shock forces. A shock-resistant carrying case provided further shock resistance to the hard disk drive cartridge and enabled the cartridge to be safely transported and stored in a secure, shock-resistant environment. The Passport product found particular acceptance within the national security field where it is necessary to lock up hard disk drives containing data embodying national secrets or classified information in safes and secure areas at night or during periods of inattention. An improvement in the original "Passport" removable hard disk technology is found in U.S. Pat. No. 5,297,067 to Blackborow et al., entitled: "Electronic Hot Connection of Disk Drive Module to Computer Peripheral Bus". The '067 patent describes methods and apparatus enabling a standard hard disk drive unit to be "hot" connected and disconnected via a standard peripheral bus interface, such as SCSI, with an associated computing system.

An expansible fixed disk drive data storage subsystem which enables attachment of a variable number of bus-level-interface hard disk drives at a single bus level logical address location is described in U.S. Pat. No. 5,097,439 to Patriquin et al., entitled: "Expansible Fixed Disk Drive Subsystem for Computer", the disclosure of which is incorporated herein by reference. A rotating hard disk drive array employing redundant array of individual disks (RAID) formed on hot-pluggable circuit cards is described in Statutory Invention Registration No. H1221 to Best et al., entitled: "High Speed Small Diameter Disk Storage System", the disclosure thereof being incorporated herein by reference.

The disclosures of U.S. Pat. Nos. 5,253,129, 5,297,067, 5,097,439 and Statutory Registration H1221 fail to describe or suggest a removable multi-drive hard disk drive system for providing not only high speed backup in a real-time computing environment, but also being separately capable of being removed to a different operating environment for providing data archival storage, periodic integrity checking and reduced bandwidth retrieval without any further physical relocation or handling of the particular drives and multi-drive modules.

Therefore, a hitherto unsolved need has remained for a removable hard disk storage array capable of emulating tape library backup and archive functions in a manner overcoming limitations and drawbacks of the prior art.

OBJECTS OF THE INVENTION

A general object of the present invention is to provide a computer-network-attached rotating hard disk storage backup and archive system which emulates tape storage backup and archive systems and which is scalable from an entry level system to an enterprise system in a manner overcoming limitations and drawbacks of the prior art.

A more specific object of the present invention is to realize vastly improved tape storage backup and archive system functionality with performance, reliability and cost advantages of hard disk drive technology in a network-attached storage system.

Yet another specific object of the present invention is to provide a data storage backup and archive library which does not require operator intervention or robots in order to move a tape cartridge between a storage bin and a tape transport with a cartridge handler mechanism, thus overcoming limitations and drawbacks of prior tape cartridge handling solutions associated with cartridge loaders and tape libraries. In fact, one object of the present invention is to eliminate the cartridge media transport mechanism entirely.

One more specific object of the present invention is to provide a network-accessible data storage backup and archive library system in which removable magazines of hard disk drives emulate magazines of removable tape cartridges.

Yet another specific object of the present invention is to implement a storage system comprising a wall of multiple rotating hard disk drives in a manner analogous to a wall of tape cartridges, yet without need for separate tape drives and robotic tape cartridge handling apparatus or other externally moving parts or components.

One more specific object of the present invention is to provide a magazine of hard disk drives which may be installed and used in a high speed, high bandwidth data storage rack electrically coupled to a high performance computer, and which may be removed to, installed in and electrically accessed at a data archive rack monitored by a supervisory controller and connected to the high performance computer via a lower bandwidth network connection.

Yet another object of the present invention is to implement a unique file mark structure for implementing tape file marks within logical block address space of a hard disk drive emulating a tape cartridge.

These and other objects, advantages, aspects and features of the present invention will be more fully understood and appreciated upon consideration of the following detailed description of preferred embodiments presented in conjunction with the accompanying drawings.

DETAILED DESCRIPTION OF PREFERRED EMBODIMENTS

Figure 1:
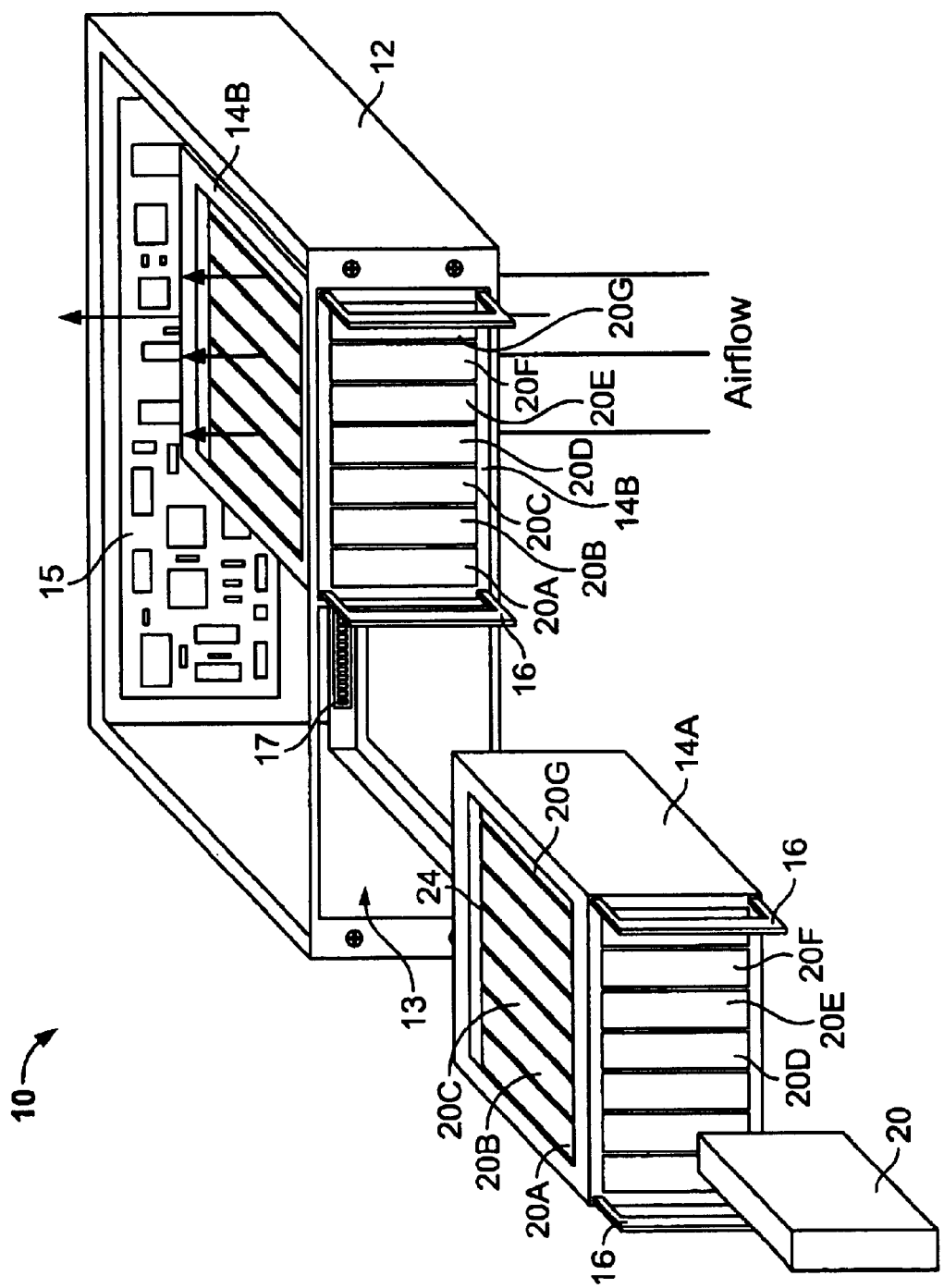
FIG. 1 is an isometric view of a storage rack or bay for holding and connecting two seven-drive rotating hard disk unit magazines in accordance with principles of the present invention.

As noted above, hard disk drives have a number of advantages over tape cartridges for backing up and archiving computer data. Hard disk drives are fully enclosed and are generally less sensitive to changes in environmental conditions, such as temperature and humidity. Hard disk drives have data storage capacities, which closely approach storage capacities of tape cartridges. Moreover, given the susceptibility to damage incident to periodic handling and repacking of the tape pancake, tape cartridges may have average useful life less than hard disk drive units. In one aspect of the present invention, hard disk drive units are installed into multi-drive magazines. The magazines plug into active storage racks of a high speed, high bandwidth data storage array of an active computing system such as a mainframe, or a network server. The drives are operated in parallel and provide high-speed random storage and access for data files.

The drives may be kept in the active environment for a number of months or years. During the period of active disk drive usage, each of the drives will be fully tested and proven to be serviceable. Once a nominal useful life of the drives of a magazine is reached, such as 3–5 years, the magazine can be transitioned to a data archive unit. Data to be archived is then recorded onto the drives of the magazine, and it is then removed from active service, transported in a suitable shock protection carrier, and reinstalled in a drive monitoring rack in an archive location. Then, on a periodic schedule, each drive is powered up and checked in turn, to be sure that it continues to function properly and provides nominal read/write functionality. The drive's prognostics are monitored and measured against a degradation profile. If a drive is determined to be failing, then a flag is set and the magazine and drive can be removed and replaced. If the data is striped across the multiple drives of the module in a known manner, the drive monitoring system may be able to reconstruct the data of the failed drive. Alternatively, a relatively low bandwidth path may exist between the active computing system and the archive system, and the active host computer may be able to reconstruct the data from the failed drive and return it to a replacement drive installed in the magazine, or in another magazine. Also, it is practical for the host computing system to retrieve archive data from the archive system via the limited bandwidth connection, thereby eliminating any requirement that the drive/magazine be handled or transported. Further advantages and features of the present invention will become even more apparent from considering the following descriptions, which accompany the drawings.

Glossary of Terms Used

ARCHIVAL MAGAZINE: A removable shock-protected storage unit for mounting and connecting a predetermined number of self-contained rotating hard disk drive units, such as 7 or 14 such units.

DATA PRESERVATION VAULT: A system of interconnected racks for receiving and connecting archival magazines and drive units. The vault may be co-located with an active computing system, or it may be located at a different site, such as a location made to be secure from hazards such as fire, floods, earthquake, storms, etc.

ATA: An acronym for "advanced technology attachment", representing a hard disk drive industry standard interface providing 100 Megabyte per second low cost parallel interface.

BRIDGE BOARD: A printed circuit board containing electronic circuitry to interconnect between a particular hard disk drive unit and one or more system interfaces.

DISK MONITORING SYSTEM: An arrangement of hardware and software for monitoring on a periodic basis all hard disk drive units of magazines installed in the Data Preservation Vault.

IEEE 1394: An industry standard 320 Megabit per second serial small computer system interface (SCSI) structure and convention.

SERIAL ATA: An industry-proposed fast serial interface for ATA interface hard disk drive units.

USB 2.0: An industry standard 480-Megabit per second universal serial bus interface structure and convention.

ACTIVE DATA STORAGE ARRAY: An on-line data storage/backup system containing one to a multiplicity of Archival Magazines.

Having in mind the foregoing, components of a removable disk storage array 10 incorporating principles of the present invention are shown in the FIG. 1 depiction. Therein, a rack-mountable storage bay, or cabinet, 12 is sized to define a plurality of wells 13 and an electronic backplane circuit board 15. In the present example, left and right wells 13 are defined within cabinet 12 to receive two hard disk drive magazines 14A and 14B. In FIG. 1 magazine 14A is shown removed from the left well 13, and in front of the cabinet 12, while magazine 14B is shown in the installed position fully within the right interior well 13 of the cabinet 12. Each magazine 14 has a standardized external physical layout arrangement ("form factor"), and may include such handling features, such as one or more handles 16 enabling an operator to grasp the magazine 14 in order to install it into a particular well 13 of cabinet 12. Most preferably, the act of installing a magazine 14 into a well 13 of cabinet 12 simultaneously accomplishes a task of connecting the magazine to electrical power supply and one or more computer data interface connector structure 17 which is part of or co-located with the backplane circuit board 15. Such an arrangement may be followed to facilitate "hot connection" or "hot swap" of magazines within the cabinet 12 in a manner described in U.S. Pat. No. 5,297,067 or Statutory Invention Registration H1221, referred to hereinabove. The magazine bay 12 is most preferably of a standardized height and a standardized width, such as 19 inches, so that it may be installed in a conventional mainframe computer equipment rack. The bay 12 is generally open at the top and bottom, so that airflow streams may be directed between the drives 20, e.g., from bottom to top as shown by the bold arrows of the FIG. 1 example.

Figure 6:
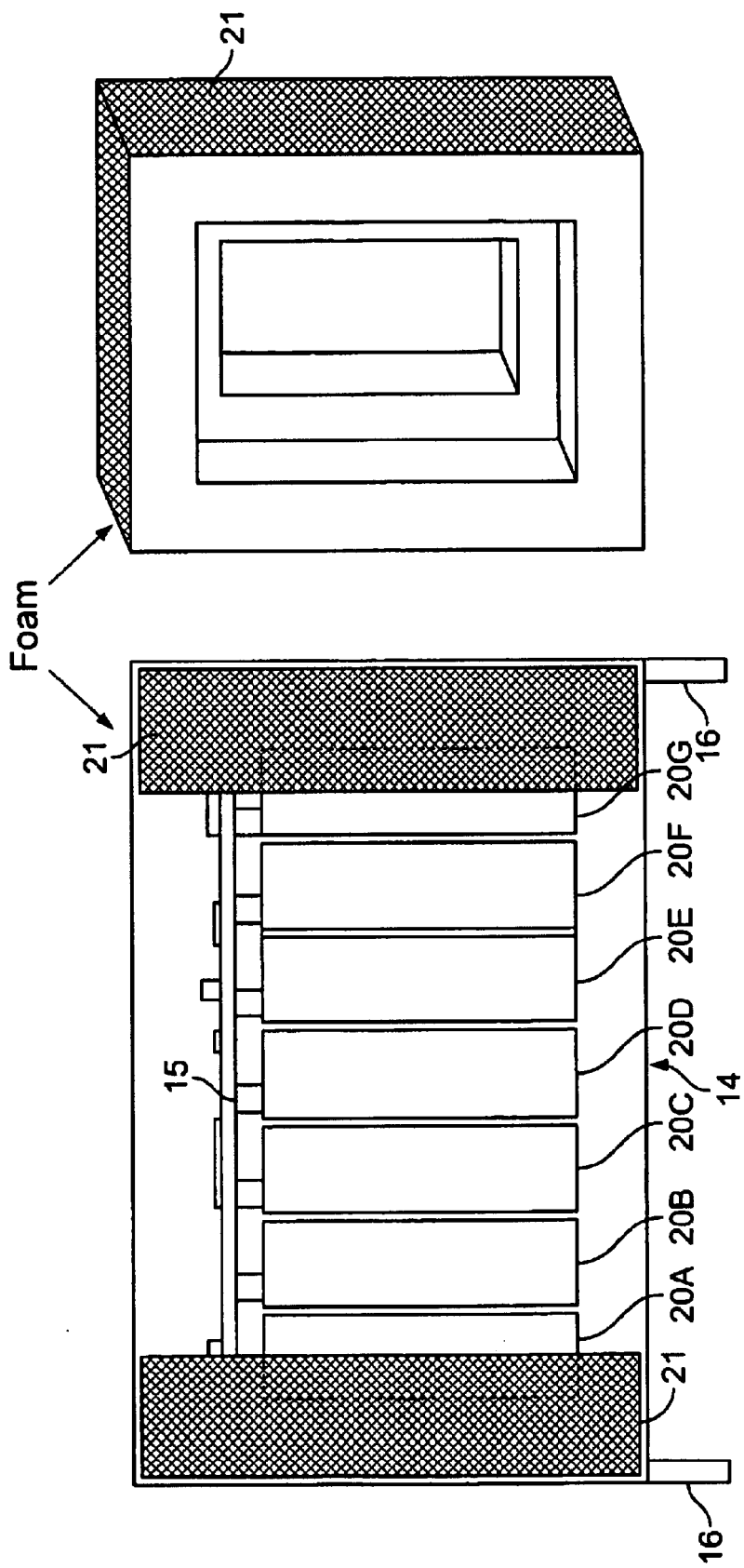
FIG. 6A is a top plan view of a multi-drive magazine of the type shown in FIG. 1, illustrating shock mounting.
FIG. 6B is an isometric view of a magazine foam shock mount of the type employed in the FIG. 6A embodiment.

Each magazine 14 most preferably includes a predetermined number of hard disk drive units 20. In the FIG. 1 example, each magazine 14A, 14B holds e.g., seven (7) hard disk drive units 20A, 20B, 20C, 20D, 20E, 20F, 20G. In the FIG. 2A example, each magazine 14C, 14D holds e.g. up to 14 hard disk drive units 20A, 20B, 20C, 20D, 20E, 20F, 20G, 20H, 20I, 20J, 20K, 20L, 20M, and 20N. Shock-resistant formed-foam mounts 21, shown in FIG. 6, are provided within each magazine 14, so that shock forces generated during normal handling of the magazine 14 during installation and removal to and from the bay 12 do not damage the delicate internal components of the hard disk drive units. Each hard disk drive unit 20 most preferably has an industry-standardized form factor, such as 3.5-inch disk diameter, half height; 2.5 inch; 1.8 inch; or 1 inch nominal disk diameter, for example. Each drive unit 20 is fully self-contained, offers specified predetermined data storage capacity and average data access time, and includes an industry-standardized interface structure and convention, such as ATA, SCSI or 1394. Ideally, each hard disk drive unit 20 provides 10 Gigabytes, or more, of data storage, and most preferably 30 Gigabytes to 200 Gigabytes or more, which equals or exceeds a contemporary data backup tape cartridge having a similar external form factor.

The hard disk drive units 20 are mounted in the magazine 14 with a slightly spaced-apart arrangement. This arrangement enables forced airflow to pass between the units and thereby cool the units 20 and backplane circuit 15 during active use, when the units operate in parallel and generate substantial heat which must be carried off or dissipated. Standard cabling (not shown) is provided to provide power and data connections between each drive unit 20 and a connector structure of each magazine which mates with the connector structure 17 of the bay 12.

Figure 2A:
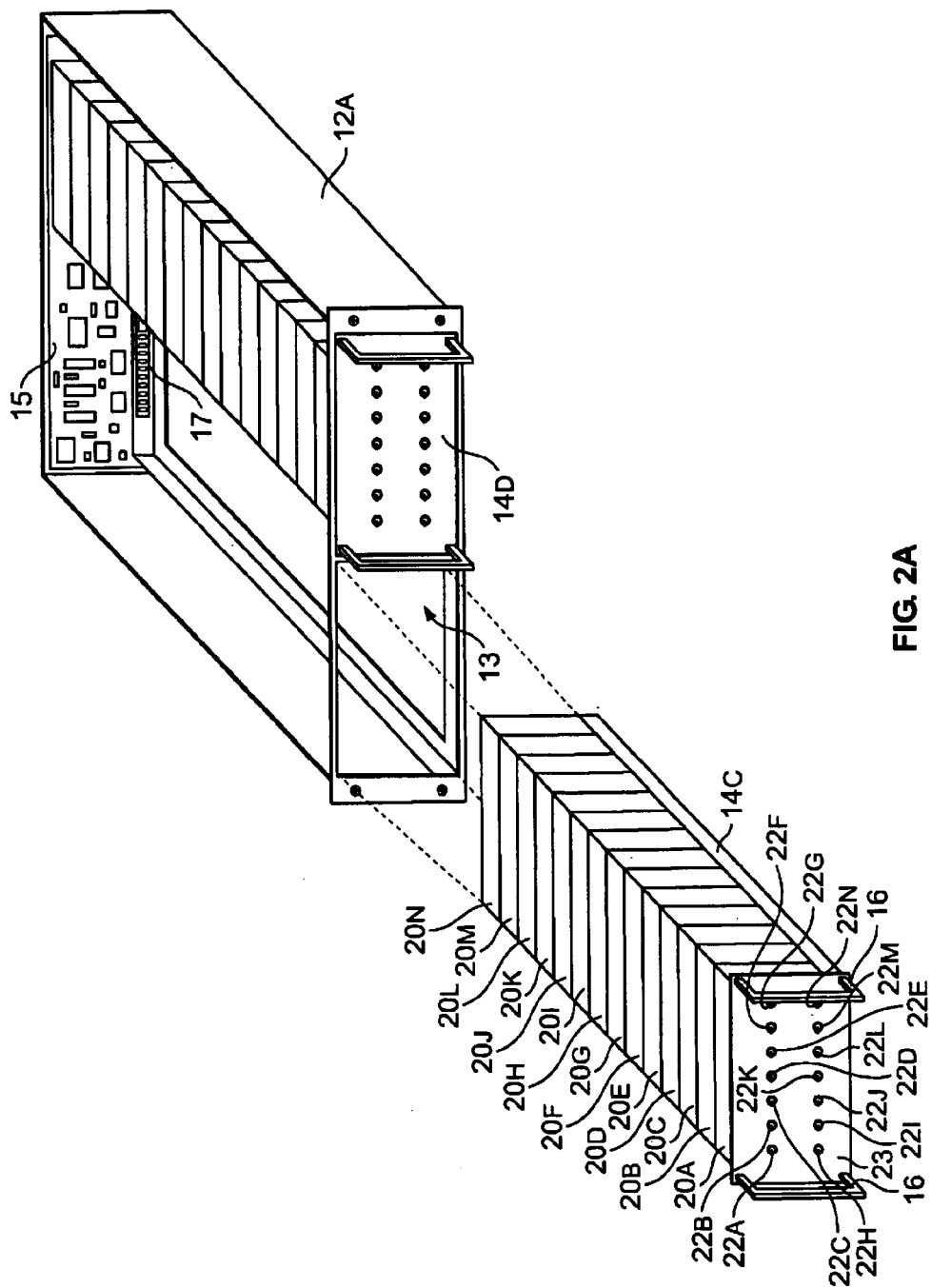
FIG. 2A is an isometric view of a rack-mounted storage bay for holding and connecting two fourteen-drive rotating hard disk unit magazines in accordance with principles of the present invention.
Figure 3A:
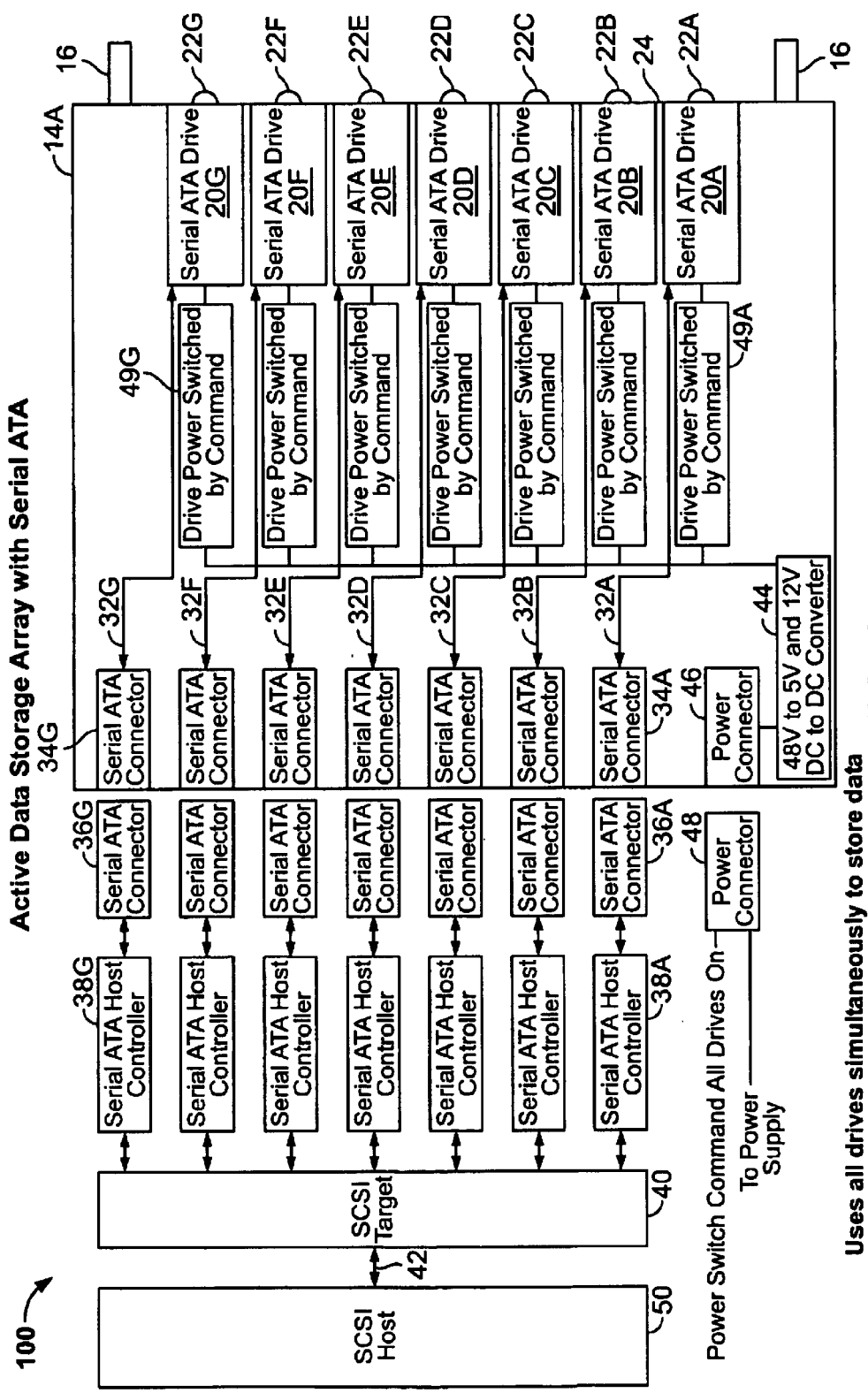
FIG. 3A is a highly diagrammatic top plan view and block diagram of one embodiment of a multi-drive magazine of the type shown in FIG. 1, illustrating a serial ATA drive interface within an active computing environment.

As shown in FIG. 3A, for example, each of the seven hard disk drive units 20A–20G is provided with a visual indicator 22A–22G, such as a light emitting diode (LED). In the FIG. 3A example, the LED units 22A–22G are mounted in a transverse lip of the magazine 14A above a front wall of each drive unit 20. In the FIG. 2A example, the magazines 14C and 14D have front panels 23, which include the 14 visual indicator LEDs 22A–22N, corresponding to drive units 20A–20N respectively. Each LED 22 may be multi-colored, so that one color, such as green, is emitted when the drive unit is operating normally, and another color, such as red, is emitted to indicate a fault condition within the particular drive unit 20. An amber color may be emitted if a particular drive is failing or degrading, but has not yet failed in service. Information about a variety of operational parameters within a particular unit 20 is typically self-collected and recorded in a reserved section of disk storage space and is available to be read from the unit in order to predict unit failure in accordance with conventional failure prediction methods. These measurements may be of the type described in U.S. Pat. No. 6,122,131 to Jeppson, entitled: "Adaptively-controlled Disk Drive Assembly", the disclosure thereof being incorporated by reference. A method for predicting early head crashes is described in U.S. Pat. No. 5,410,439 to Egbert et al., entitled: "Disk File with Clearance and Glide Measurement and Early Head Crash Warning", the disclosure thereof being incorporated herein by reference. Since standard hard disk drive units 20 no longer are equipped with activity lights, the visual indicators 22 are arranged as part of magazine 14 so as to be readily visible to an operator facing the front of the magazine 14.

Figure 2B:
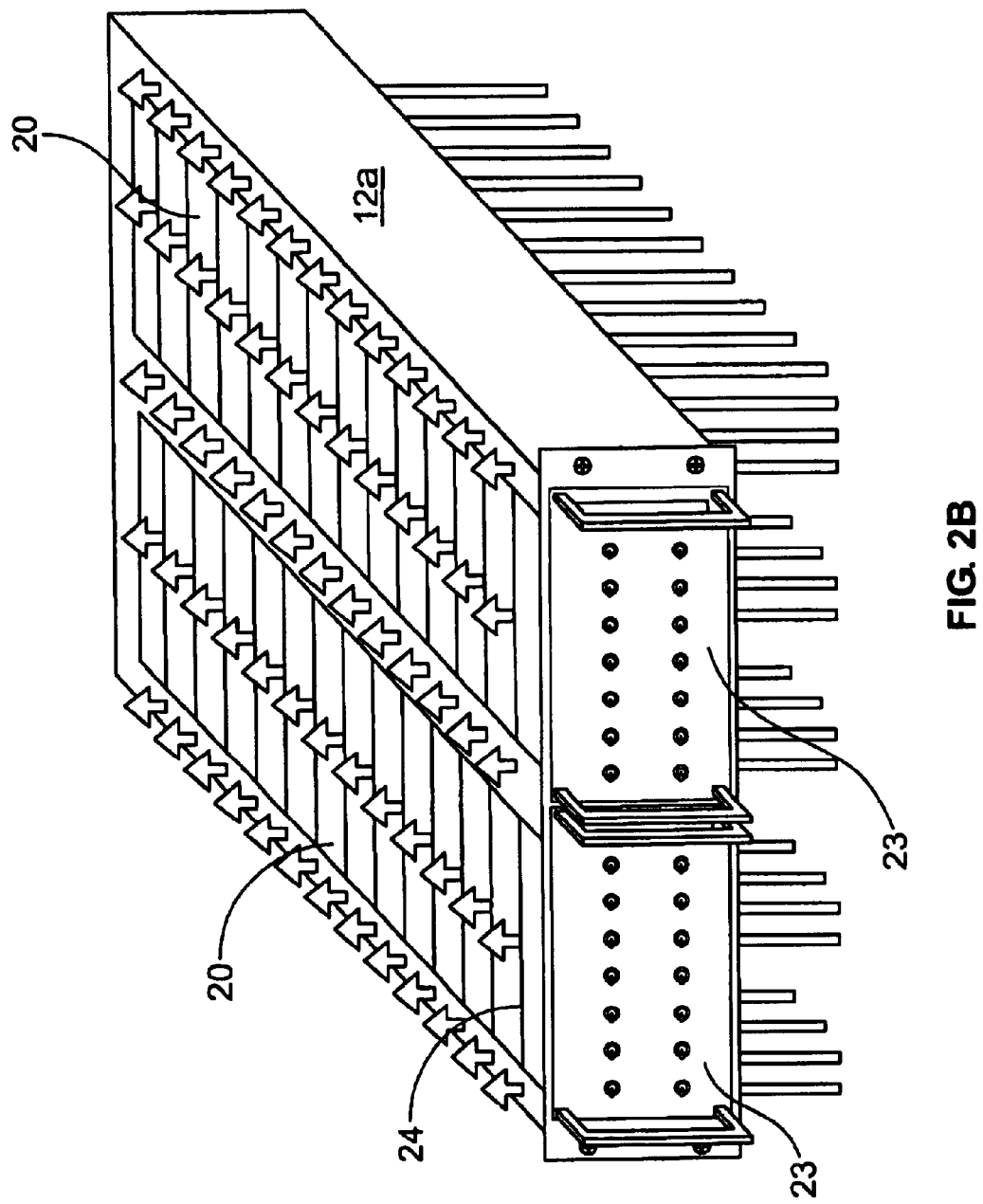
FIG. 2B is a highly diagrammatic, isometric view of the FIG. 2A storage bay and magazines, illustrating flow of cooling air across individual drive units.
Figure 9:
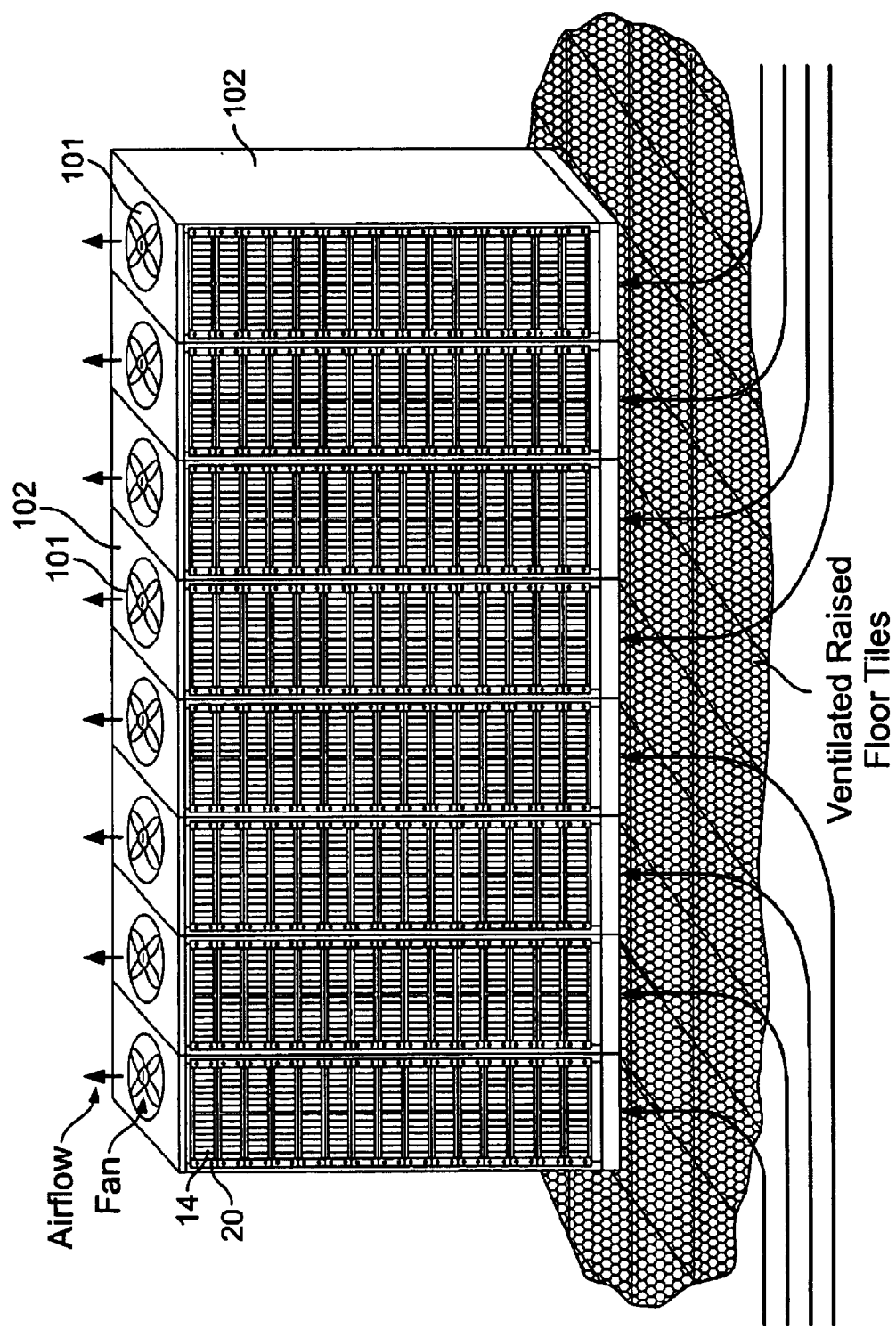
FIG. 9 is an isometric view of an active hard disk data storage system comprising a series of racks holding a multiplicity of hard drive magazines and showing air ventilation paths and means.

As shown in FIGS. 1, 3A, 4A and 5, the drive units 20 are most preferably mounted together within a magazine 14 in a closely-spaced-apart side-by-side arrangement that provides an air-space 24 between adjacently facing major sidewalls of adjacent drive units 20, thereby admitting an airflow for cooling, as perhaps best shown in FIG. 2B. Cooling fans 101 at the top of magazine racks 102 of an active backup storage system 100 (FIG. 9) pull air from the ambient through the racks 102 and magazines 14 in order to achieve the desired cooling airflow. This provides the needed cooling of the drive units 20 when they are simultaneously operating and functioning in the active computing environment.

In the active computing environment 100 depicted in FIG. 3A, the magazine 14A includes, in addition to the seven drives 20A–20G a series of internal serial buses 32 and serial connectors 34 in number equal to the number of drive units 20 present. In this present example, serial buses 32A, 32B, 32C, 32D, 32E, 32F and 32G respectively connect serial ATA interfaces of drive units 20A, 20B, 20C, 20D, 20E, 20F, and 20G to serial connectors 34A, 34B, 34C, 34D, 34E, 34F and 34G of the magazine 14A. These connectors 34A–34G respectively mate with serial bus connectors 36A–36G of the bay 20 (as part of connector structure 17 shown in FIGS. 1 and 2A). A set of Serial ATA Host controllers 38A–38G may be respectively connected to connectors 36A–36G. The controllers 38A–38G then connect to a SCSI target circuit 40, which connects via a suitable SCSI bus 42 to a SCSI host 50 within a host computing system. Each magazine 14 may be provided with a unique identifier, such as bar code pattern readable by a conventional bar code scanning system, and/or an electrical identifier such as an embedded serial number readable by the control circuitry 15 of a particular bay 20. Alternatively, each disk drive 20, or the magazine 14, or the bay 12, may include an internet protocol (IP) address in accordance with the internet data transfer protocol, TCP/IP. An optically readable identifier is preferably provided so that the identity of a particular magazine may be established during transit or storage and without need to plug the particular magazine 14 into a bay 12. The reader may be included as a part of the bay 12, or the reader may additionally or alternatively be a hand held unit of conventional design and function.

Power is most preferably supplied to each drive unit 20 in parallel from a high efficiency 48V to 5V/12V DC to DC switching converter circuit 44 located within the magazine 14A. The converter 44 derives its operating power through a magazine power connector 46 which mates with a bay power connector 48 connected to a DC power supply providing sufficient power to operate all seven of the drives 20 simultaneously. Drive operating power may be switched on at each drive unit 20 under software control from the host 50. Individual drive unit power switching is illustrated in FIG. 3A by a power command register/switch circuit 49, there being seven such circuits 49A, 49B, 49C, 49D, 49E, 49F, and 49G associated respectively with drive units 20A–20G.

Figure 3B:
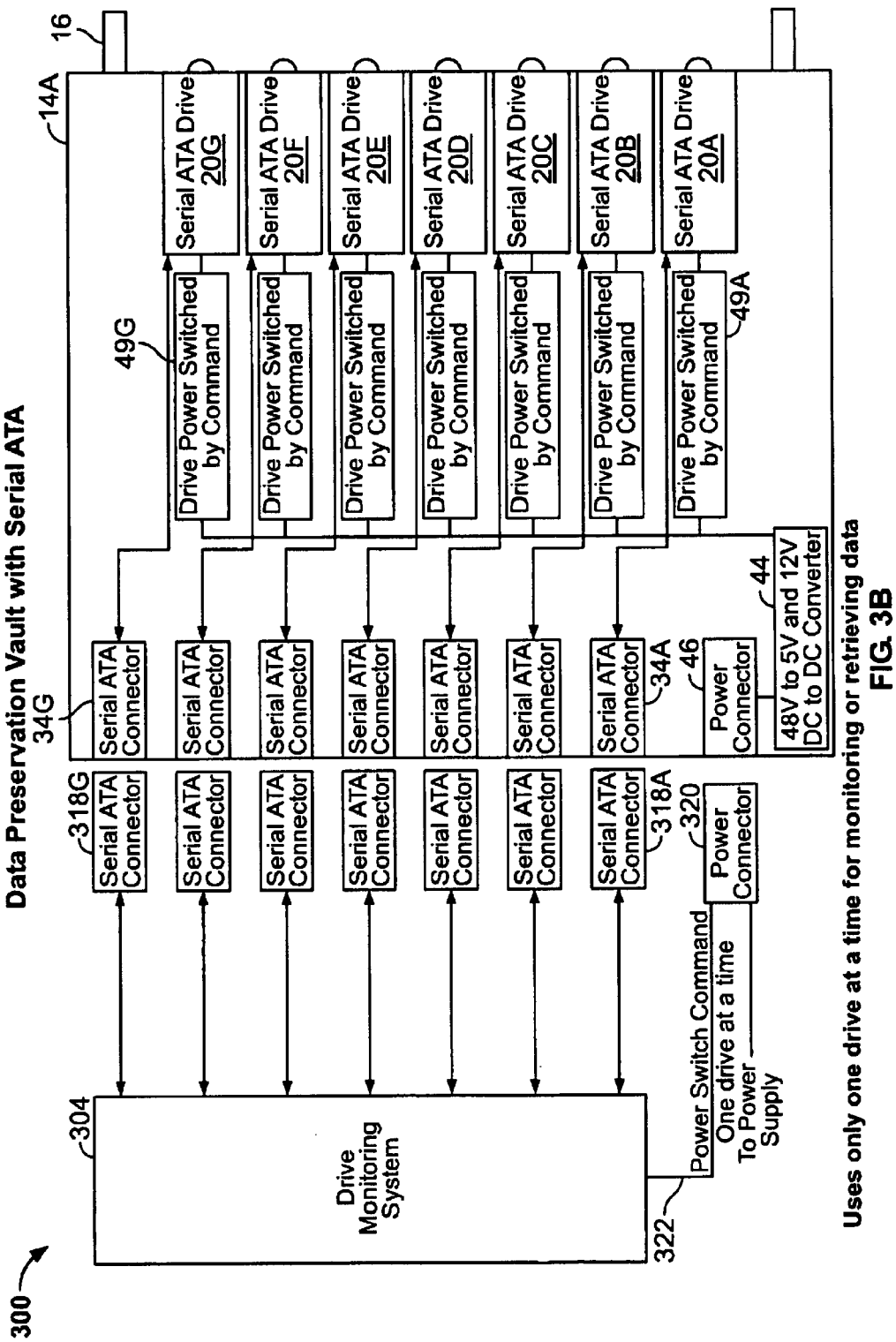
FIG. 3B is a highly diagrammatic top plan view and block diagram showing the FIG. 3A magazine within an inactive data preservation environment, in accordance with principles of the present invention.

Once archive data is written onto disk drive units 20 within a magazine 14 at an active storage system 100, the magazine 14 may be removed and reinstalled at a bay within a rack of the data preservation vault. FIG. 3B illustrates a data preservation vault 300, which includes a drive monitoring system 304. The drive monitoring system 304 includes compatible data and power plug connectors, which mate with, like connectors of the magazine 14. In the example of FIG. 3B, serial ATA connectors 318A, 318B, 318C, 318D, 318E, 318F, 318G mate respectively with connectors 34A–34G of magazine 14. A power connector 320 mates with power connector 46 of magazine 14. Since only one disk drive unit 20 will be powered at any time in the archive vault 300, the power connector 320 may have a smaller power handling capacity than the connector 48 of the active system 100. The drive monitoring system 304 includes a control line 322 for controlling a switch within the power connector 320 for selectively applying power to the DC to DC converter 44. Power to be applied to a particular drive is most preferably handled by drive unit commands sent from the drive monitoring system 304 to a particular drive unit 20 via the serial ATA bus structure.

Figure 4A:
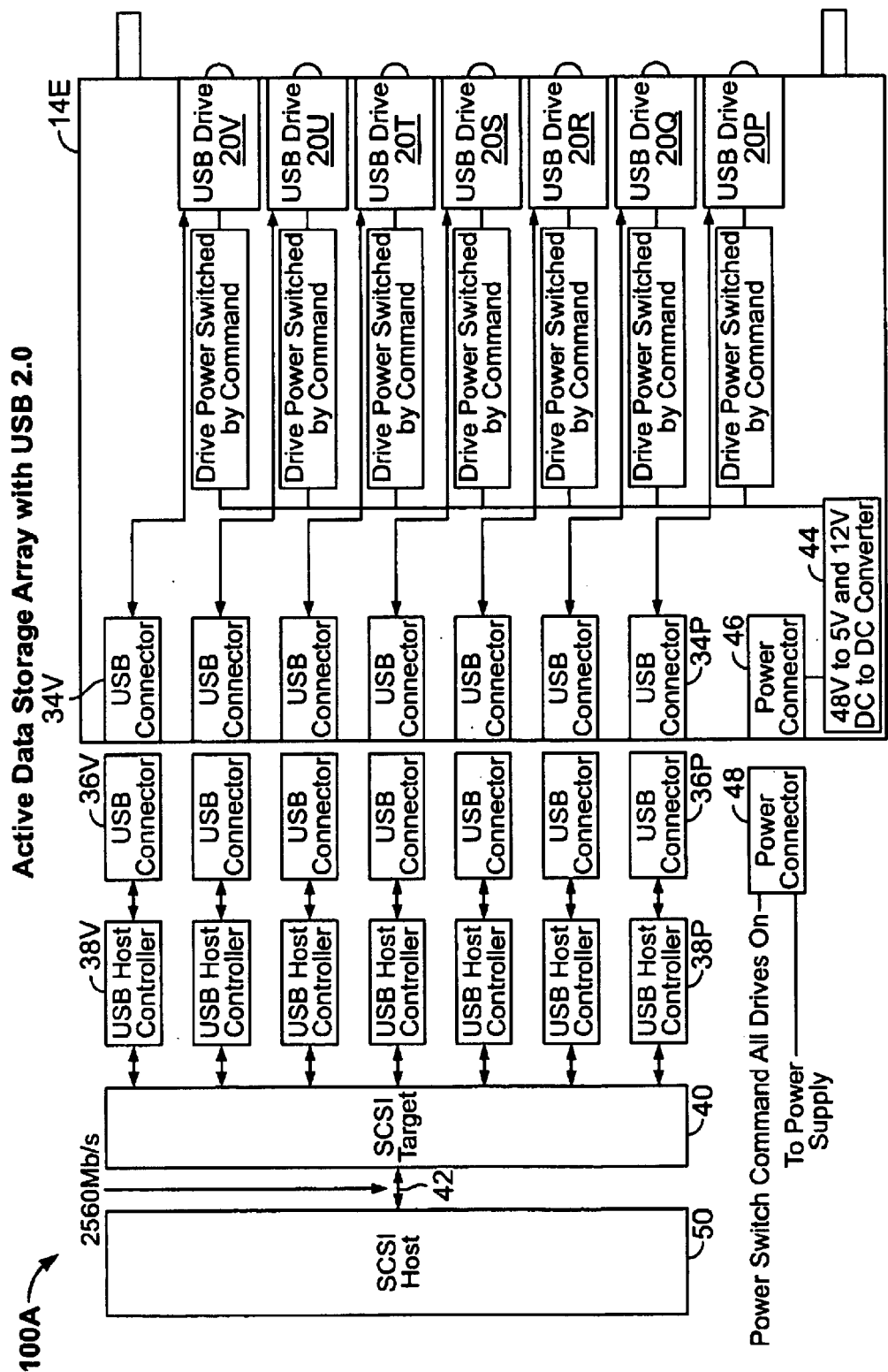
FIG. 4A is a highly diagrammatic top plan view and block diagram of a second embodiment of a multi-drive magazine of the type shown in FIG. 1, illustrating a USB parallel bridge interface within an active computing environment.

FIG. 4A illustrates an active data storage array 100A employing drive units in accordance with the USB 2.0 interface convention. A drive magazine 14E holds seven USB drives 20P, 20Q, 20R, 20S, 20T, 20U and 20V. The magazine 14E includes seven USB interface connectors 34P, 34Q, 34R, 34S, 34T, 34U, and 34V which respectively connect to drive units 20P–20V. The active unit 100A includes USB connectors 36P–36V which mate with magazine connectors 34P–34V, respectively. Seven USB host controllers 38P–38V are located between connectors 36 and the SCSI target 40. The SCSI target 40 connects to the SCSI host computing environment 50 via a high speed (2560 Mb/second) bus 42.

Figure 4B:
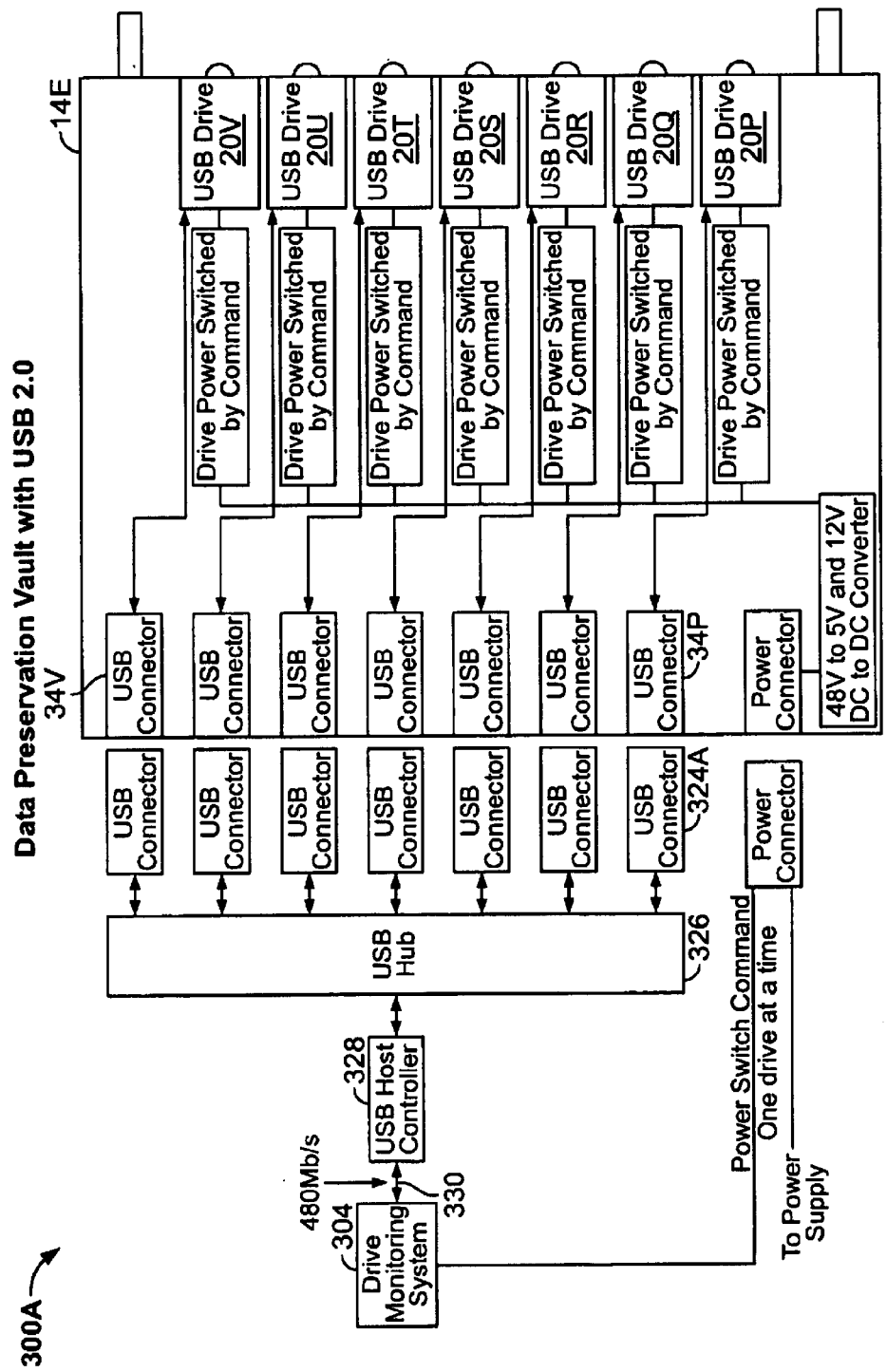
FIG. 4B is a highly diagrammatic top plan view and block diagram showing the FIG. 4A magazine within an inactive data preservation environment.

FIG. 4B illustrates a data preservation vault 300A for use with USB 2.0 magazine 14E. In this example, connectors 324P–324V mate with 10 connectors 34P–34V and also to a USB hub circuit 326. The USB hub connects to a USB controller 328. The USB controller 328 connects too the drive monitoring system 304 via a lower speed bus structure 330 (operating in this example at 480 Mb/second). Otherwise, the FIG. 4A–4B system is the same as the FIG. 3A–B system. Alternatively, each magazine 14 may include the USB hub 326 internally and provide a single USB connection to the SCSI target controller 114 for concentrating and distributing data from and to each drive unit 20, as shown in the FIG. 8 arrangement, discussed below.

Figure 5:
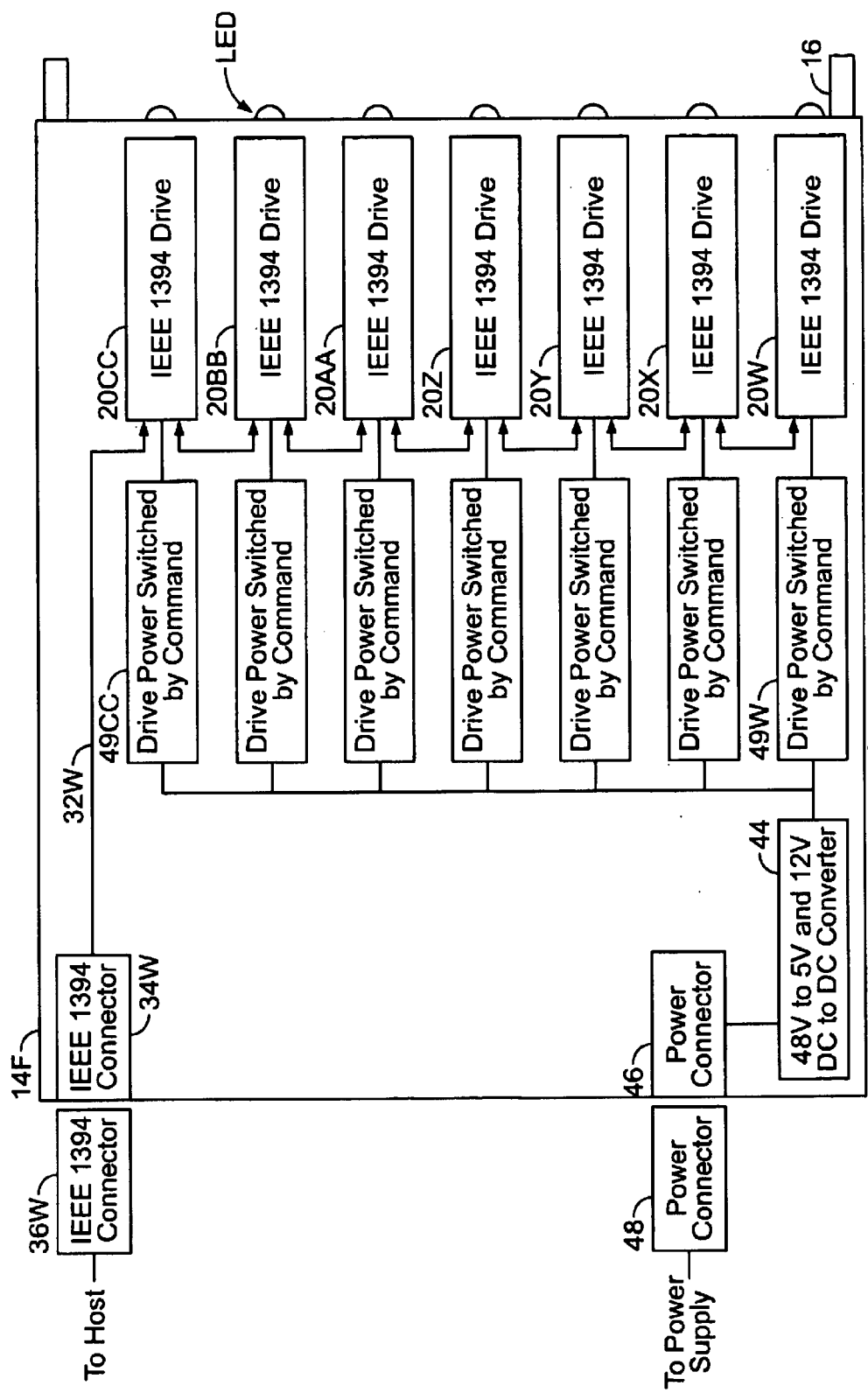
FIG. 5 is a highly diagrammatic top plan view and block diagram of a third embodiment of a multi-drive magazine of the type shown in FIG. 1, illustrating a 1394 Standard computer interface architecture.

It is not necessary that the hard disk drive units be ATA or serial USB drives. For example, FIG. 5 illustrates seven interface type 1394 hard disk drive units 20W, 20X, 20Y, 20Z, 20AA, 20BB, 20CC installed within an interface type 1394 magazine 14F. With the type 1394 interface convention, the interface bus of drives 20W–20CC may employ a single data bus 32W which is daisy-chained to all of the drive units and ultimately leads to a type 1394 magazine connector 34W arranged to mate with a bay type 1394 connector 36W. While individual magazines 14 and magazine bays 12 may be provided for each interface type, a universal plug-jack interconnection system may be provided in accordance with known techniques, thereby to enable a magazine 14 to be used with disk drive sets of diverse interface conventions.

FIGS. 6A and 6B illustrate a shock mounting arrangement for use within the drive unit magazine 14. Therein, formed-foam shock absorbers 21 are placed between an outer frame of the magazine 14 and a bundle comprising the side-by-side mounted hard disk drive units 20. Each shock absorber 21 may be formed to define a series of nested rectangular spaces and openings adapted to fit closely over an outermost disk drive unit 20A or 20G, and provide an air passage to improve ventilation and cooling of the nested disk drive unit.

Figure 7:
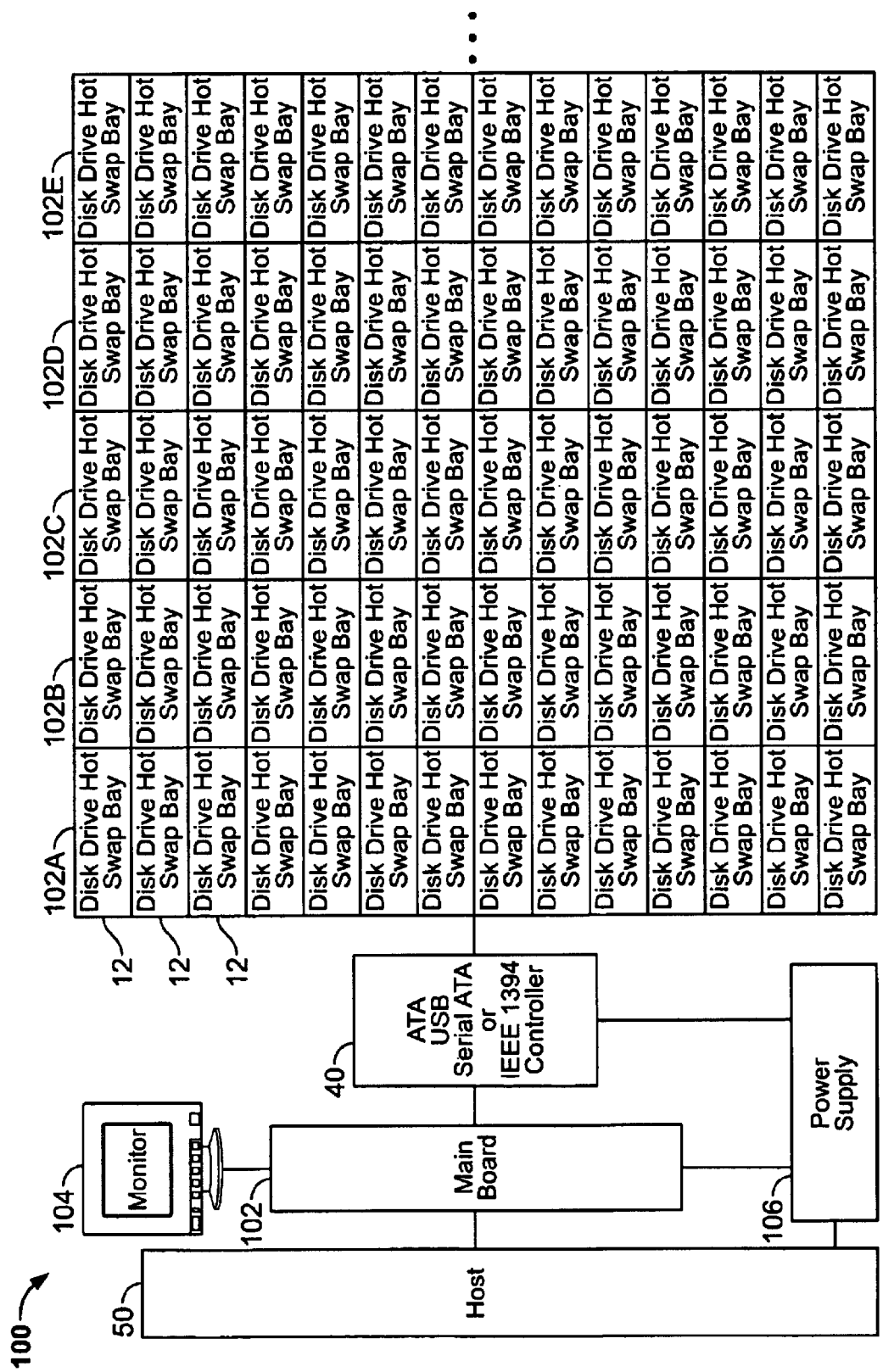
FIG. 7 is an electrical block diagram of a removable hard disk storage system comprising an array of multi-drive magazines for emulation of high transfer rate tape library backup functions within a central computing environment.

Turning now to FIG. 7, a computing center active disk drive system 100 includes a multiplicity of hot-swap bays 12 of the type shown in FIGS. 1 and 2A, and associated HDD magazines 14, as shown in FIGS. 3A, 4A and/or 5. The system 100 is arranged in a series of large mounting racks 102, there being five such units 102A, 102B, 102C, 102D and 102E shown in the FIG. 7 example. Dots to the right side of the rack 102E denote expandability of the system beyond the five racks shown in FIG. 7. In addition to the interface subsystem 40 and host computer 50, the active system 100 may include a main board 102, an operator display 104, and a power supply 106, for controlling the magazines 14 and drives 20. The power supply 106 provides primary operating power to the main board 102, controller 40, display 104 and each drive magazine 14 installed within the array of racks 102. As configured, the system 100 may provide active data backup as a full emulation of a tape library wherein each drive 20 emulates a separate tape cartridge. Alternatively, the active system 100 may provide a primary random access data store for the host computer 50 and be configured in accordance with RAID or any other known storage system architecture and methodology.

Most preferably, the system 100 emulates a tape library system, such as a tape library shown in commonly assigned U.S. Pat. No. 5,925,119 to Maroney, entitled: "Computer Architecture for Automated Storage Library", the disclosure thereof being incorporated herein by reference. In a virtual tape emulation system 100, the main board 102 intercepts commands issued to a tape library system and converts tape-library-specific commands such as media load/unload commands into electrical control signals for selecting/spinning up and down of a particular disk drive 20 and tape-file specific commands such as file read or write into logical block based disk-drive-specific commands by which logical block address locations are randomly accessed by the selected drive 20 so that a series of user data block read or write operations are carried out on a tape file structured basis.

Figure 8:
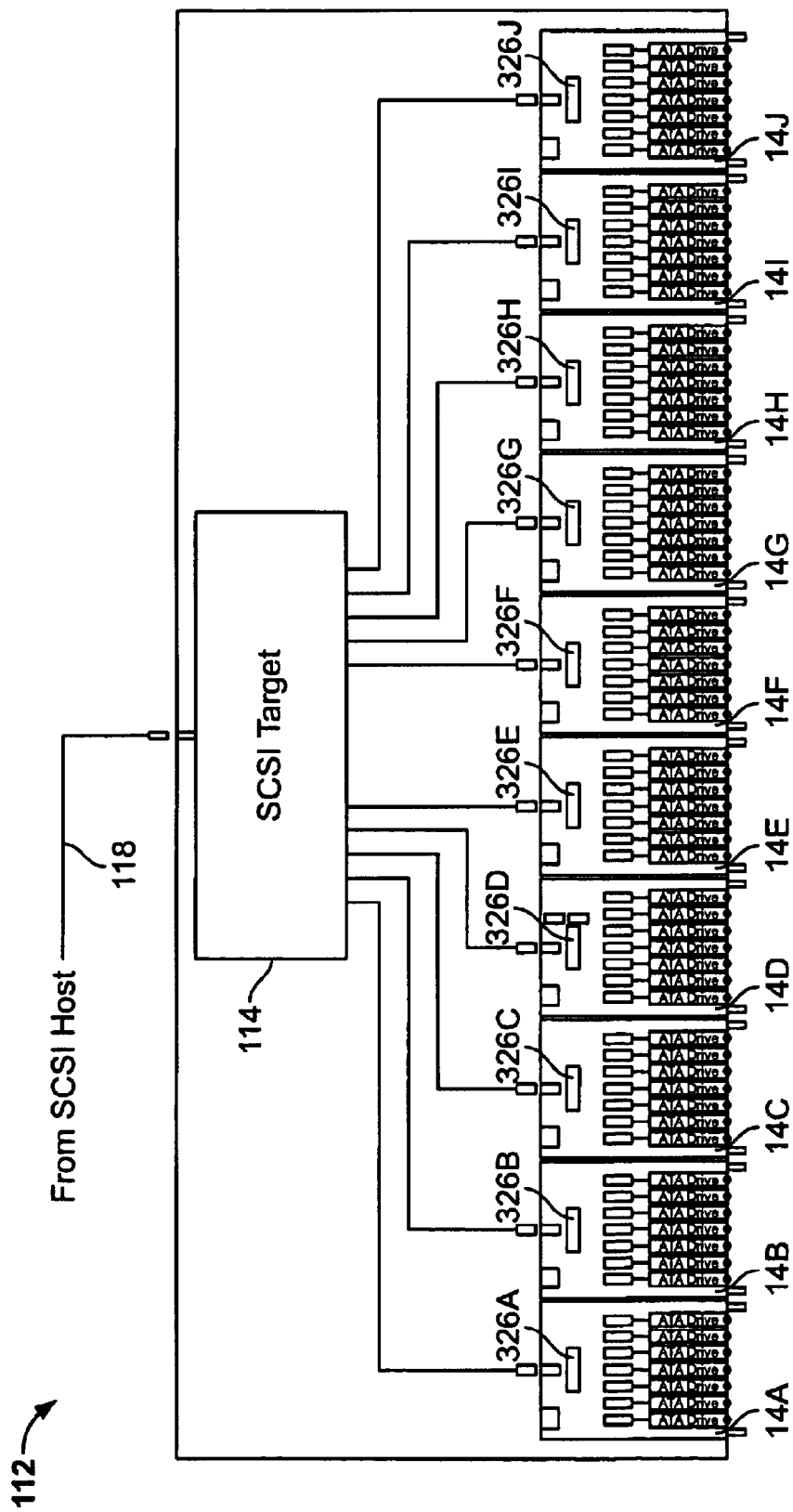
FIG. 8 is an electrical block diagram of a removable hard disk storage system of the type shown in FIG. 7 wherein a SCSI bus architecture is employed within the central computing environment.

FIG. 8 illustrates an embodiment 112 of the system 100 within an active computing environment which is configured to include a single SCSI target controller 114 for handling e.g. ten data unit magazines 14A, 14B, 14C, 14D, 14E, 14F, 14G, 14H, 14I, and 14J. The target controller 114 has a high bandwidth SCSI bus 118 leading to a SCSI host of the active computer system (not shown in FIG. 8). In this particular example, each magazine 14 is attached via a single SCSI port connector to the SCSI target controller 114, and each drive 20 within each magazine 14 has a SCSI interface.

Figure 10:
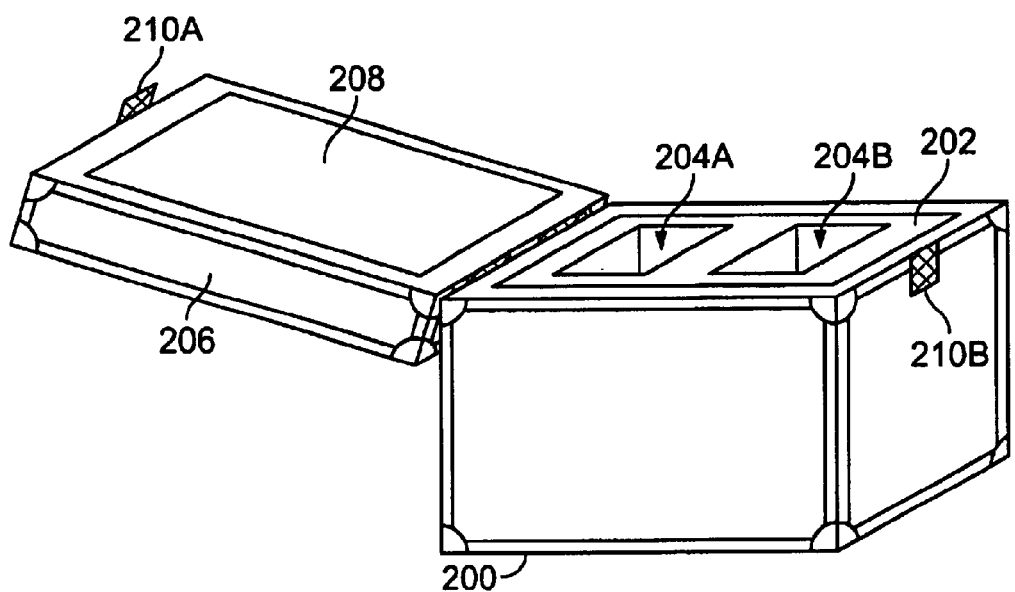
FIG. 10 is an isometric view of a shock-insulated transport case for transporting up to two multi-drive magazines from the central computing environment to a secure archive environment at a remote site.

FIG. 10 shows one embodiment of a shock-providing carrying case 200 for transporting magazines 14 from the active computer center to the archive location. The case 200 includes a shock-resistant foam insert 202 that defines one or more wells, there being two wells 204A and 204B shown in the FIG. 10 example. A lid 206 hinged to the case 200 and also having a shock-resistant foam sheet 208 secures magazines 14 placed in wells 204 against shock forces of the type typically encountered in removal to the archive location. A two-part latch mechanism 210A, 210B releasably secures the lid 206 to the case 200 in a closed position which causes facing walls of the foam insert 202 and lid sheet 208 to engage the magazines 14 and provide needed shock resistance for transport.

Figure 11:
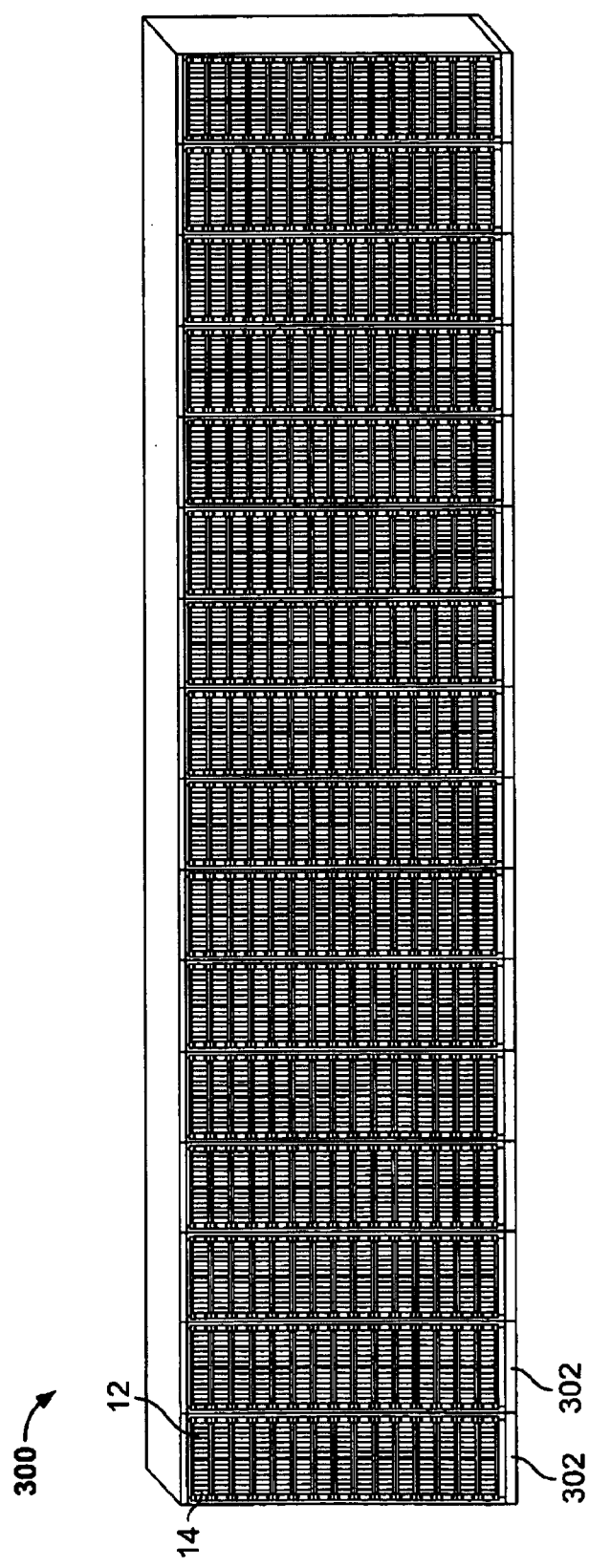
FIG. 11 is an isometric view of an off-line archival storage rack system for receiving a multiplicity of multi-drive hard disk magazines and for connecting each magazine to a drive monitoring system.
Figure 12:
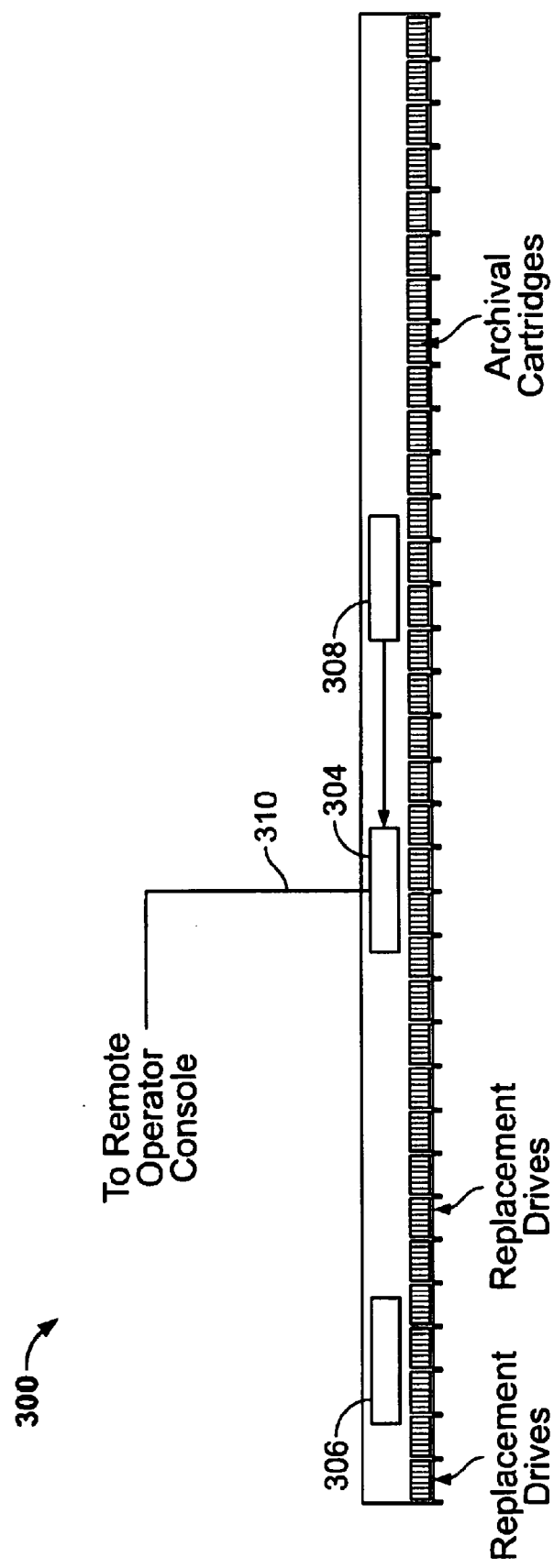
FIG. 12 is a diagrammatic top plan view of the FIG. 11 off-line archival storage rack system.

FIGS. 11 and 12 illustrate aspects of an archive system 300 that includes one or a series of side-by-side storage racks 302. The racks 302 may be located in any desired location, and most preferably in a secure archive location, such as a basement, vault, cave, or other location deemed to be secure against known hazards. The racks 302 may be grouped together, or they may be separated and located at otherwise unused areas of a computing center. Because the disk drives 20 in each magazine 14 are inactive for long periods of time, there is no need for level of power supply or ventilation at the data preservation vault 300 that is needed for the racks 102 of the active backup system 100.

The drive monitoring system 304 includes a power supply 306 and connects to each magazine 14 installed in a particular rack 302 to supply power and a bus connection selectively to each drive 20 within a particular magazine 14, in order to carry out periodic testing and incidental archive data retrieval without requiring any operator intervention. The archive disk monitoring system controller 304 includes data inputs from an array 308 of environmental sensors, such as temperature, humidity, security access, etc. Most preferably, the archive system controller 304 includes a data path 310 extending to a remote operator console. The remote operator console enables the data vault 300 to be remotely accessed and monitored. Also, the channel 310 enables remote access to the archive information stored on one of the drives of one of the magazines of the system 300, should such real-time access be desired or required.

Figure 13:
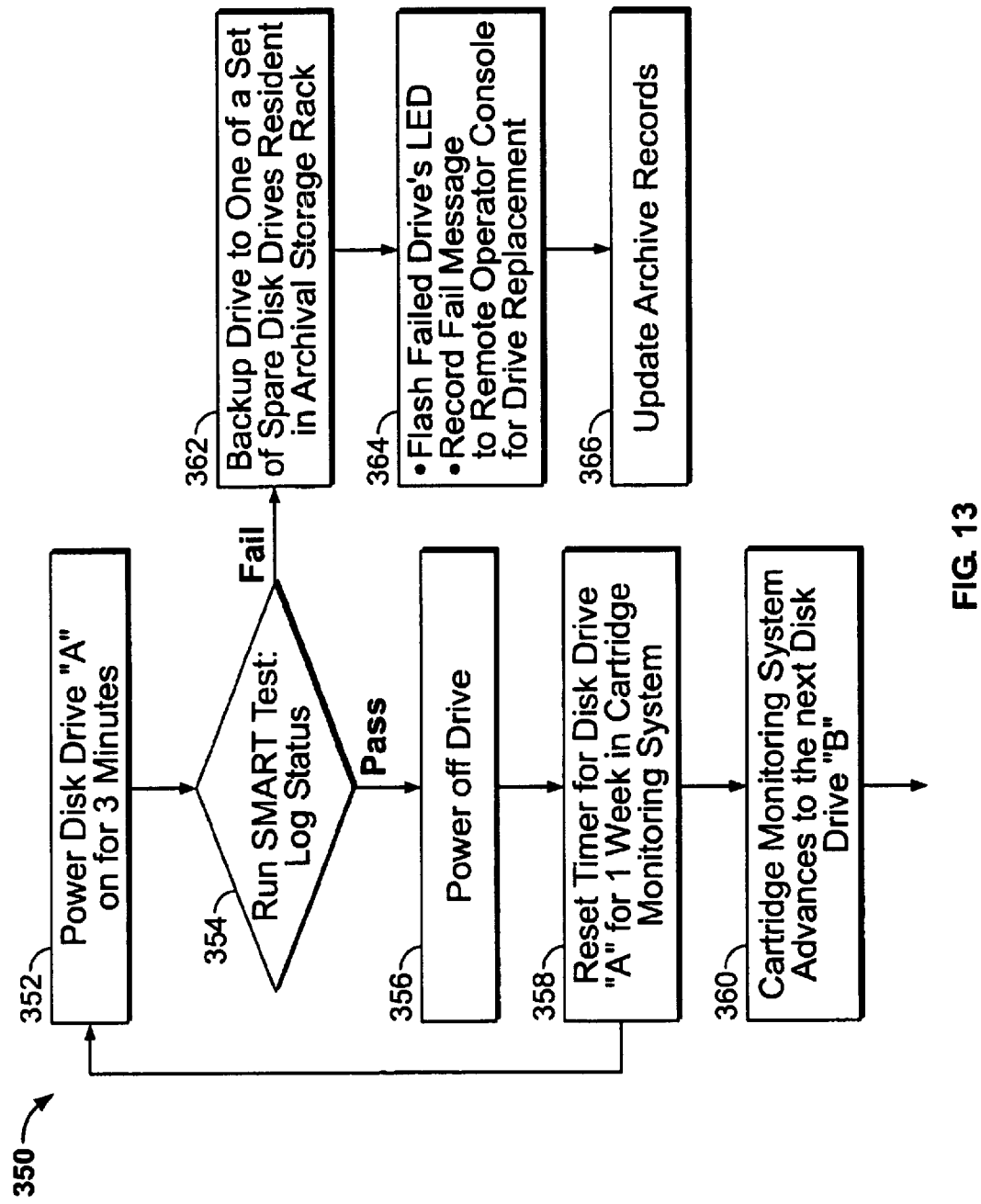
FIG. 13 is a flowchart illustrating operation of the FIG. 11 offline archival storage rack system in accordance with principles of the present invention.

FIG. 13 sets forth a flowchart of one exemplary disk drive monitoring routine 350 carried out by the data archive controller 304. At a step 352 the controller 304 applies power to one of the drives 20 within a particular magazine 14 in accordance with a master testing list maintained by and within the controller 304. The power is applied for a predetermined time period, such as three minutes or less, for example. At a step 354, the controller 304 sends a "run smart test" command to the drive under test. (The "run smart test" command is a host interface command within a superset of commands and enables a host computing system to test the disk drive and receive status information. The disk drive undergoing testing provides status information back to the controller 304, such as its prognostics record. The controller 304 determines at the step 354 whether the drive undergoing testing passes or fails the smart test routine. If the drive presently being tested passes the smart test, the controller 304 ceases to apply power to the drive at a step 356. The next test interval for the particular drive passing the smart test is then recorded in the master testing list by the controller 304 at a step 358, and the testing procedure advances to a next drive on the testing list at a step 360, resulting in a return to step 352 and a repeat of the testing sequence is carried out for this next drive.

If, however, during the initial testing interval established by step 352, the disk drive undergoing testing fails to pass the smart test, disk drive 20Z for example, but still provides some functionality, as tested at a step 362, a stand-by archive drive 20R is located among the drives and the magazines of the rack 302, and the archive data on drive 20Z is transferred to the stand-by drive 20R during the step 352. Then, at a step 364 the controller 304 causes the panel lamp 22Z of the failed drive 20Z to flash in a manner indicating failure of the particular drive. At step 364 a message is also sent to the operator console to alert an attendant that an archive drive has failed and needs to be replaced within a particular magazine. The controller 304 then updates the archive records at a step 366 to reflect that the archive data once present on failed drive 20Z has been transferred to stand-by archive disk drive 20R.

If the failed drive 20Z loses all functionality, the controller 304 generates a message (step 368) based on its archive database to the host active system, indicating that the drive 20Z has completely failed. This message is most preferably sent via modem 308 and communications channel 310. The host computer may then be able to reconstitute the data lost on drive Z by resort to error correction techniques associated with data striping across multiple drives. In this regard, the host computer may request the archive system 300 to retrieve user data stripes and error correction overhead from other drives present within the array 300 and transmit that data in serial stream fashion to the host over channel 310. The host, then applying its error correction/recovery capability then reconstructs the data once held on drive z and sends that data over the channel 310 to a second stand-by drive 20RR, thereby completing the restoration of data within the archive array 300.

Figures 14, 15:
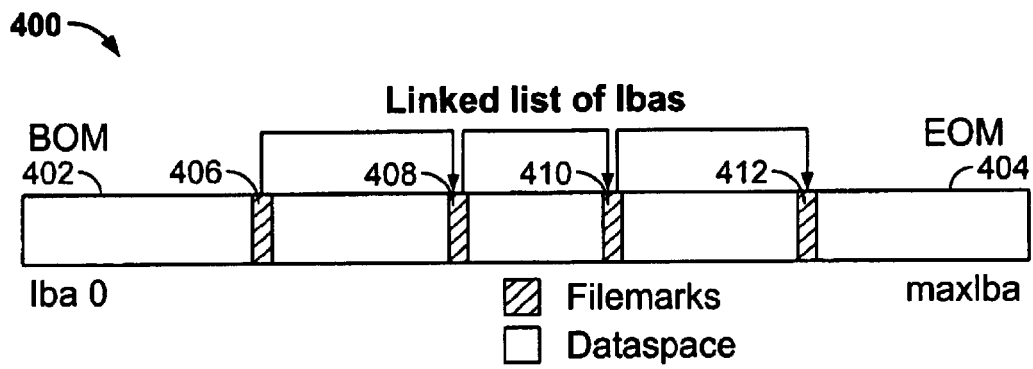
FIG. 14 is a diagram mapping logical block address space of a hard disk drive to storage space of a tape cartridge, showing placement of double linked file mark data structures.
FIG. 15 is a table illustrating structure of a file mark shown in the FIG. 14 diagram.

In one aspect of the present invention, each hard disk drive 20 may emulate a tape cartridge having a predetermined storage capacity, where each hard disk drive 20 defines an electrical data storage capacity at least equal to the predetermined storage capacity of the tape cartridge being emulated. In this aspect of the invention a disk drive will record "tape marks" or "file marks" which would normally be recorded onto tape by a tape drive. "File marks" represent overhead information (metadata) sent by the host to be written on tape to mark a boundary or partition, typically between files or volumes of user data information. In the present invention, file marks and other metadata intended to be recorded on a tape are actually written to a particular hard disk drive 20. One presently preferred arrangement is shown in FIG. 14. Therein, a logical block address space 400 of a hard disk drive 20 is mapped to file space of a virtual tape media, including a beginning-of-media (BOM) mark 402, and an end-of-media (EOM) mark 404. The BOM mark 402 corresponds to a logical block address zero (lbaO), while the EOM mark 404 corresponds to a maximum logical block address (maxlba). Between the BOM mark 402 and EOM mark 404 are a series of file marks, four such file marks 406, 408, 410 and 412 being illustrated in the FIG. 14 example. Each file mark 406, 408, 410 and 412 has a separate logical block address.

In use the host computer will issue a command that a master file mark be written to the media (which the host believes is tape, for example) The active system controller 106 causes the master file mark to be written outside of user logical block address space. On ATA disk drives 20 of the type discussed in connection with FIGS. 3A and 3B, the master file mark is written to one of 32 host-vendor-specific SMART log sectors. On SCSI/FibreChannel disk drives, of the type shown in FIG. 5, the master file mark is written to the Client Application log page, for example. When a WRITE FILE MARK command is received by the main board 102, it will cause a selected drive to write a file mark structure at a current logical block address and update previous file mark data structures to include the address of the latest file mark just written. As shown in FIG. 14, the file marks 406, 408, 410, 412, etc., are written across logical block address space in a linked manner most preferably comprising a double linked list heuristic. As shown in FIG. 15, the file mark block structure is recorded in its own separate LBA sector of 512 bytes, for example. The file mark record structure includes a title field ("FILEMARK"), a major version field, a minor version field, a partition number, a byte of flag/validity bits, a previous File Mark LBA, a next File Mark LBA, block size, reserved bytes, and two bytes of check sum, for example.

When the host computing system "loads" a virtual cartridge in the active backup system 100, a particular disk 20 drive is selected and reads the master file mark in its reserved space. It then traverses the file mark linked list and stores all file mark address locations in a file mark table of the active storage system's volatile memory. When the selected disk drive receives a SPACE command to move to the next or previous number of file marks, the main board 102 retrieves the cache memory entry and moves the disk drive's LBA pointer to the file mark location. When the active system main board 102 receives a READ or WRITE command, it will check the file mark cache memory to insure that the request does not cross a file mark boundary of the selected drive. If it does not, it will read or write the requested data file. If it does, then the active system main board 102 will issue a CHECK_CONDITION response to the host system.

In another alternative embodiment, a data preservation system is realized which embodies desirable characteristics of a RAID array with file access times less than 100 milliseconds and random data access, and also embodies desirable characteristics of a tape library which include ability to passivate a data volume by removing it from the drive thereby reducing both exposure and management costs while maintaining a relatively low demand upon electrical and thermal resources (because of the small number of active devices). With conventional hard disk drive interconnect architectures it has been extremely difficult to provide a system which has the best characteristics of a random access RAID array and a tape library. Recent advances in storage networking offer new architectural alternatives. For example, if each hard disk drive of the array uses the TCP/IP internet protocol and employs an Ethernet-like physical transport technology, each hard disk drive may be provided with a unique address and can be readily disconnected and powered down, and then powered up and reconnected to the network without disturbing other storage devices or elements of the network. The native network interface may be provided at the drive level, or it may be provided at the magazine level, or the bay level. In the present example, the data protection system comprises a large number of high capacity (30 GByte to 100 GByte) hard disk drives, each drive having a direct network attachment and a unique network address.

A system controller controls the drives by providing power, monitoring status, and providing redundancy (e.g. data striping or mirroring) as well as virtualizing the interface between the drives and the (e.g. user data backup) application. The system network then effectively supports simultaneous transfer of data to and from a large number of rotating hard disk drives. While any one of the many known network connection arrangements are preferred, one particularly preferred example is several switched segments of Gigabyte Ethernet (GbE). In this approach, the computer support environment providing power and cooling is scaled to accommodate simultaneous operation of a small fraction, e.g. 5% to 10%, of the total array of disk drives simultaneously. The magazine approach described hereinabove can be employed to facilitate swapping of hard disk drives as well as removal and safe storage of hard disk drives containing archived user data.

Fundamental to the foregoing approach is the rotating hard disk drive unit itself. While any merchant market disk drive might be used, there are several characteristics that are highly desirable for disk drive units employed in the applications described herein. Among the most important disk drive characteristics are: a) a high confidence in data retention and integrity in an extended powered-off state; b) a native network interface; c) reliable, effective power cycling with minimum "drive ready" time latency from a powered-off condition; d) drive unit high data storage capacity and low cost per Gigabyte of user data stored; e) reliable initialization, control and monitoring for effective archive system management; and, f) convenient removal and replacement of disk drive units, and of magazines, to enable physical swap-out of drives, and removal and storage of drive magazines in an archive environment, most preferably of the type described hereinabove.

It will now be appreciated that the present invention provides protection of large user data files by employing disk drives in place of tape cartridges in a unique manner and configuration. The disk drives are most preferably arrayed within disk drive magazines. Each magazine holds a complement of high data capacity rotating hard disk drives which may emulate a like complement of tape cartridges. The disk drives may be initially employed in the active computing environment, and later on, after a nominal service life, the disk drives may be "retired" to provide the long-term data archival functions described herein. Alternatively, new hard disk drives may initially be employed to provide the tape emulation/data archive functions of the systems described herein.

Having thus described several embodiments of the present invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and descriptions herein presented are purely illustrative and are not intended to be in any sense limiting.

What is claimed is:

1. A hard disk drive data archive system for emulating electrically a tape library including a multiplicity of tape cartridges each having a predetermined storage capacity, the hard disk drive data archive system comprising:

a hot pluggable multi-drive magazine comprising a housing and a plurality of hard disk drives installed within the housing, wherein the hot-pluggable multi-drive magazine is hot pluggable within the hard disk drive data archive system, each hard disk drive upon installation being connected to receive power and data from the magazine in a controlled fashion, and each hard disk drive defining an electrical data storage capacity at least equal to the predetermined storage capacity of said tape cartridge being emulated.

2. The hard disk drive data archive system set forth in claim 1, further comprising a magazine receiving system connected to a host data processing system and for physically receiving the magazine and thereupon providing power and data connections to the magazine, such that when the magazine is received within the magazine receiving system, the hard disk drives selectively receive power and data connections with the magazine receiving system, and archive system control means associated with the magazine receiving system for enabling virtual loading and unloading of said hard disk drives in response to host data processing system commands issued to load and unload tape cartridges being emulated.

3. The hard disk drive data archive system set forth in claim 1 wherein said hard disk drive implements a tape file mark structure in hard disk logical block address space as a double linked list heuristic including pointers to a latest file marker and a next file marker.

4. The hard disk drive data archive system set forth in claim 3 wherein each file mark structure occupies a separate sector in logical block address space of said drive.

5. A method for archiving user data within an active data processing system comprising steps of:

A. transferring said user data to be archived to a hard disk archive array comprising at least one hot pluggable multi-drive magazine, the hot pluggable multi-drive magazine being hot pluggable within the hard disk archive array and having a housing and a plurality of hard disk drives installed within the housing, each hard disk drive upon installation being connected to receive power and data from the magazine in a controlled fashion; and, a magazine receiving system connected to the active data processing system for physically receiving the magazine and thereupon providing power and data connections to the magazine, such that when the magazine is received within the magazine receiving system, the hard disk drives selectively receive power and data connections with the magazine receiving system, B. removing the magazine from the magazine receiving system connected to the active data processing system following completion of transfer of user data to be archived, C. installing the magazine in a data preservation vault in a secure location remote from a location of the active data processing system, and, D. periodically and selectively applying power to each one of the hard disk drives installed within the magazine in the data preservation vault during a drive testing interval, and carrying out drive performance checks upon said drive during the drive testing interval.

6. The archiving method set forth in claim 5 wherein the step (D) includes a step of read-verifying archived data stored on said one of the hard disk drives being performance checked.

7. The archiving method set forth in claim 6 wherein the step of read-verifying archived data stored on said one of the hard disk drives is carried out by the archive magazine receiving system by using a limited bandwidth data and control connection with said drive.

8. The archiving method set forth in claim 7 wherein the step of read-verifying archived data stored on said one of the hard disk drives is carried out by sending control signals to said drive from an archive computer associated with the archive magazine receiving system and receiving status and user data from said drive at said archive computer.

9. The archiving method set forth in claim 8 wherein the archive computer has a network connection to an active data processing system and comprising further steps of receiving an archived user data file retrieval request from the active data processing system via the network connection, retrieving the archived user data file from at least one of the hard disk drives of a magazine installed in the archive magazine receiving system and sending the retrieved archived user data file to the active data processing system via the network connection.

10. The archiving method set forth in claim 5 being adapted to emulate a cartridge tape library and including the step of assigning each said hard disk drive to emulate a tape cartridge of said cartridge tape library.

11. The archiving method set forth in claim 10 wherein the step of assigning each hard disk drive to emulate a tape cartridge is carried out by associating said hard disk drive with a single tape cartridge of the cartridge tape library.

12. The archiving method set forth in claim 10 including a further step of implementing a tape file mark structure in logical block address space of said hard disk drive as a double-linked-list heuristic including pointers to a last file marker and a next file marker.

13. The archiving method set forth in claim 12 wherein the step of implementing a tape file mark comprises the step of recording each file mark structure within a separate sector in logical block address space of said drive.

* * * * *